(12) United States Patent
Makimura et al.

(10) Patent No.: US 6,919,008 B2
(45) Date of Patent: Jul. 19, 2005

(54) CONVEYANCE APPARATUS FOR USE WITH CARRIAGES

(75) Inventors: Katsuyoshi Makimura, Osaka (JP); Kazutoshi Tsugawa, Osaka (JP); Masanori Fujihara, Osaka (JP)

(73) Assignee: Daifuku Co., Ltd. (JP)

( * ) Notice: Subject to any disclaimer, the term of this patent is extended or adjusted under 35 U.S.C. 154(b) by 649 days.

(21) Appl. No.: 10/031,651

(22) PCT Filed: Mar. 12, 2001

(86) PCT No.: PCT/JP01/01922

§ 371 (c)(1),
(2), (4) Date: Nov. 9, 2001

(87) PCT Pub. No.: WO01/74639

PCT Pub. Date: Oct. 11, 2001

(65) Prior Publication Data

US 2003/0005884 A1 Jan. 9, 2003

(51) Int. Cl.[7] ............................................. C25D 13/22
(52) U.S. Cl. ..................... 204/623; 204/623; 204/624; 204/198; 118/423
(58) Field of Search ................................ 204/623, 624, 204/198; 118/423

(56) References Cited

FOREIGN PATENT DOCUMENTS

| JP | 80201/1990 | 7/1990 |
| JP | 123837/1988 | 9/1998 |

*Primary Examiner*—Kishor Mayekar
(74) *Attorney, Agent, or Firm*—Kusner & Jaffe

(57) ABSTRACT

A transport object support means (40) is rotated about an anteroposterior axis (39) by a rotary control means (30), whereby a transport object (85) supported by the transport object support means (40) can be displaced in the vertical direction and the orientation of the transport object (85) can be varied during the vertical displacement without moving the carriage (10). As a result, the distance needed to displace the transport object (85) in the vertical direction can be dispensed with, the section (apparatus) for treating the transport object (85) can be shortened and made more compact, and the varying orientation of the transport object (85) can be utilized to perform a variety of treatments smoothly and efficiently without affecting the environment.

14 Claims, 15 Drawing Sheets

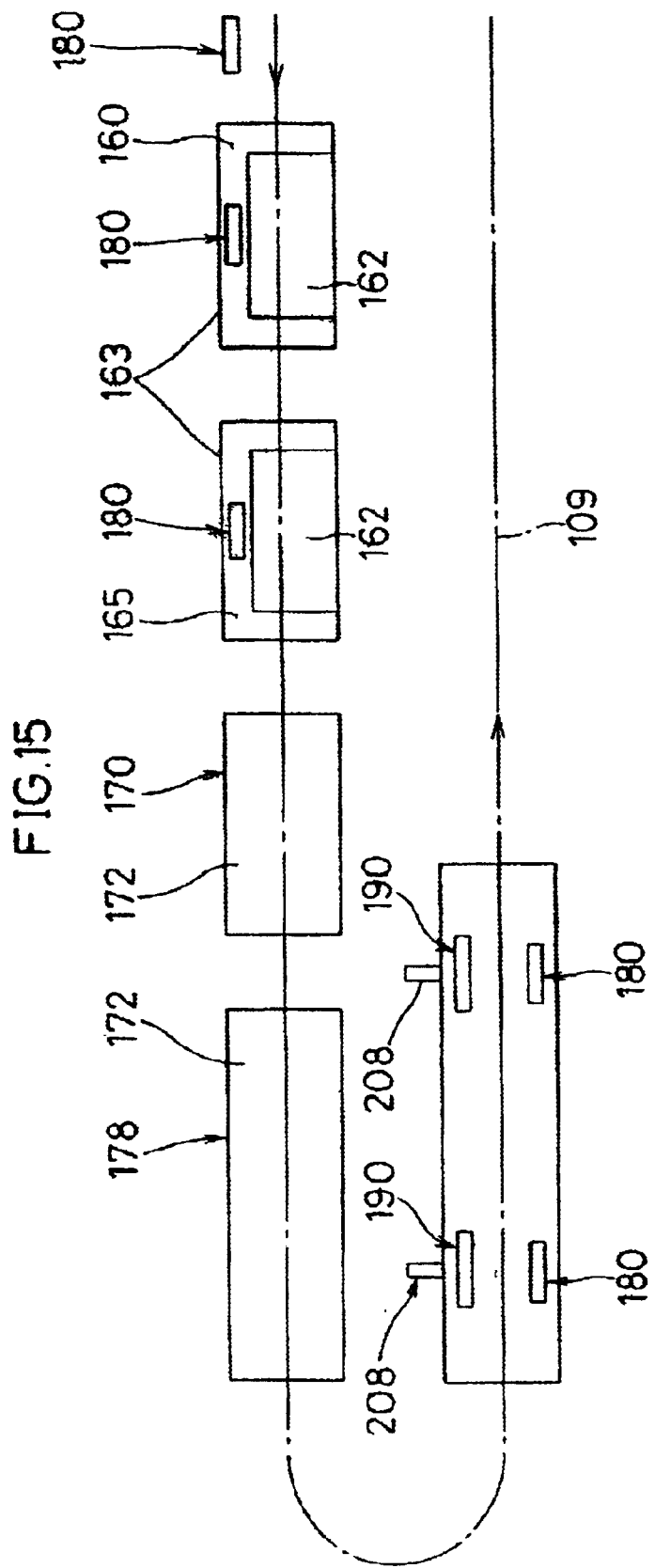

CONVEYANCE APPARATUS FOR USE WITH CARRIAGES

This application is a 35 U.S.C. 371 National Stage filing of PCT/JP01/01922 filed 12 Mar. 2001.

TECHNICAL FIELD

The present invention relates to a conveyance apparatus for use with carriages, employed when components are coated, polished, baked/dried, or otherwise treated while being transported, for example, in a manufacturing plant.

BACKGROUND ART

In conventional practice, structures containing carriages capable of traveling along fixed routes while being supported and guided by rail devices, with hanger devices provided in pendant form to the carriages, have been proposed as conveyance apparatus (for example, as conveyance apparatus for use in painting lines). In such apparatus, transport objects are conveyed along fixed routes by the movement of carriages on which these transport objects are supported by the rail devices. Paint solution tanks are provided at prescribed positions along the fixed routes; the transport objects being conveyed are introduced (dipped) into the paint solution, with the route sections corresponding to these paint solution tanks considered as "down" route sections; and the objects are thus coated by electrodeposition.

With such conventional structures, the transport objects are gradually introduced into the paint solution while the carriages are moving, and the transport objects are then gradually lifted from the paint solution while the carriages are still moving. In other words, the transport objects are displaced in the vertical direction together with the carriages while the carriages are moving, with the result that the paint solution tanks are designed as long and bulky structures with consideration for the travel distances needed for introducing and removing the transport objects. In addition, the transport objects being lifted fail to completely shed excess paint solution, drip this solution when conveyed to the next step, and contaminate the environment.

DISCLOSURE OF THE INVENTION

In view of the above, a first object of the present invention is to provide a conveyance apparatus for use with carriages in which the transport object alone can be displaced in the vertical direction without moving the carriage, and in which the orientation of the transport object can be varied during the vertical displacement thereof.

A second object of the present invention is to provide a conveyance apparatus for use with carriages in which a paint solution can be continuously electrodeposited, drained, and dried under optimal conditions.

A third object of the present invention is to provide a conveyance apparatus for use with carriages in which a paint solution can be electrodeposited (first-stage treatment), drained, and used for a second-stage treatment continuously and efficiently.

Aimed at attaining the first object, the conveyance apparatus for use with carriages in accordance with the present invention comprises a rail device and a carriage supported and guided by this rail device and allowed to move along a fixed route, wherein this conveyance apparatus for use with carriages is characterized in that the carriage is provided with a rotary control means extending transversely to the left and right from the carriage body; and a transport object support means capable of rotating about an anteroposterior axis is provided to the free end section of the rotary control means.

According to the above-described arrangement of the present invention, a transport object support means is rotated about an anteroposterior axis by a rotary control means, whereby a transport object supported by the transport object support means can be displaced in the vertical direction and the orientation of the transport object can be varied during the vertical displacement without moving the carriage. As a result, the distance needed to displace the transport object in the vertical direction can be dispensed with, the section (apparatus) for treating the transport object can be shortened and made more compact, and the varying orientation of the transport object can be utilized to perform a variety of treatments smoothly and efficiently without affecting the environment.

A first preferred embodiment of the conveyance apparatus for use with carriages in accordance with the present invention is characterized in that the rotary control means is supported and guided by a guide rail laid along the rail device.

According to the first invention, the rotary control means is supported and guided by a guide rail, allowing the transport object support means to rotate or the carriage to move smoothly without causing the transport object support means to sway in the vertical direction, whereby the transport object can thus be treated accurately and efficiently in a variety of ways.

A second preferred embodiment of the conveyance apparatus for use with carriages in accordance with the present invention is characterized in that the guide rail is laid between the rail device and the anteroposterior axis.

According to the second invention, the rotary control means is supported and guided by the guide rail laid between the rail device and the anteroposterior axis while weight balance is preserved, allowing the transport object support means to rotate or the carriage to move smoothly without causing the transport object support means to sway in the vertical direction.

A third preferred embodiment of the conveyance apparatus for use with carriages in accordance with the present invention is characterized in that a rotary drive means capable of connecting with and disconnecting from the rotary control means is provided at a prescribed location along the fixed route.

According to the third invention, the rotary drive means can be rotated by the rotary control means, and the transport object support means can be rotated about an anteroposterior axis as a result of the fact that the carriage is stopped at a prescribed location and the rotary drive means is connected to the rotary control means. A more lightweight carriage can therefore be used, and the fixed route can be accommodated by a narrower space.

A fourth preferred embodiment of the conveyance apparatus for use with carriages in accordance with the present invention is characterized in that the rotary control means has a transversely extending control shaft, and the rotary drive means can be put in or out of engagement with the control shaft by a transverse movement.

According to the fourth invention, the rotary drive means can be put in or out of engagement with the control shaft by being moved transversely to the left or right after the carriage has been stopped at a prescribed location.

A fifth preferred embodiment of the conveyance apparatus for use with carriages in accordance with the present invention is characterized in that the rotary control means has a transversely extending control shaft, and the rotary drive means can be put in or out of engagement with the control shaft by being moved to approach to or distance from the external periphery.

According to the fifth invention, the rotary drive means can be put in or out of engagement with the control shaft by being moved to approach to or distance from the external peripheral direction after the carriage has been stopped at a prescribed location.

A sixth preferred embodiment of the conveyance apparatus for use with carriages in accordance with the present invention is characterized in that the transport object support means comprises a base on the side of the rotary control means, and a distal portion for supporting the transport object, the distal portion being able to pivot about a longitudinal axis in relation to the base.

According to the sixth invention, the orientation of the transport object supported by the distal portion can be varied by turning the distal portion in relation to the base, making it possible to facilitate the treatment of the transport object and to perform this treatment in a uniform manner.

A seventh preferred embodiment of the conveyance apparatus for use with carriages in accordance with the present invention is characterized in that the fixed route passes through a treatment section, and the rotary control means is rotated in accordance with the type of treatment performed in this treatment section.

According to the seventh invention, the angle of rotation (amount of rotation) of the transport object support means can be adjusted according to the type of treatment, and an arbitrary orientation can be selected for the transport object, making it possible to facilitate the treatment of the transport object.

An eighth preferred embodiment of the conveyance apparatus for use with carriages in accordance with the present invention is characterized in that the transport object support means is rotated into a pendant position, and a liquid treatment is performed on the transport object supported on the free end section of the transport object support means in the treatment section.

According to the eighth invention, the transport object supported by the transport object support means can be brought into the lowermost position and subjected to a liquid treatment by the rotation of the transport object support means into a pendant position. A variety of liquid treatments can thus be performed on the transport object in a smooth and efficient manner without affecting the environment.

A ninth preferred embodiment of the conveyance apparatus for use with carriages in accordance with the present invention is characterized in that, at a prescribed location along the fixed route, a turning means is provided for turning, about a longitudinal axis, a transport object support means that has been rotated about an anteroposterior axis into a horizontal position.

According to the ninth invention, the transport object support means (that is, the transport object) can be turned sideways about a longitudinal axis by actuating a turning means after the transport object support means has been turned sideways, making it possible to uniformly treat the transport object in a variety of ways.

Aimed at attaining the second object, the tenth embodiment of the conveyance apparatus for use with carriages in accordance with the present invention is characterized in that the fixed route passes through an electrodeposition chamber and a drying furnace; that, in the electrodeposition chamber, the transport object support means is rotated into a pendant position where the transport object supported on the free end section of the transport object support means is introduced into a paint solution tank, and the transport object support means is then rotated into a horizontal position where the transport object is drained of excess solution; and that, in the drying furnace, the transport object support means is rotated into a vertical position where the transport object is dried.

According to the tenth invention, the transport object is introduced (dipped) into the paint solution tank and subjected to the desired electrodeposition coating (liquid treatment) by the rotation of the transport object support means into a pendant position. Excess paint solution can be adequately shed by the transport object as a result of the fact that the transport object support means is stopped in the middle of a rotation cycle and the transport object is oriented sideways, making it possible to prevent the solution from dripping during the transfer of the object to the next step and to create a less contaminated environment. The transport object can be subsequently dried in the desired manner by moving the carriage through the area occupied by a drying furnace in a state in which the transport object support means is rotated into a vertical configuration and the transport object is placed above the carriage. The paint solution can thus be continuously electrodeposited, drained, and dried under optimal conditions.

Aimed at attaining the third object, the eleventh embodiment of the conveyance apparatus for use with carriages in accordance with the present invention is characterized in that the fixed route passes through a plurality of treatment sections; that, in the first-stage treatment section which is an electrodeposition chamber, the transport object support means is rotated into a pendant position where the transport object supported on the free end section of the transport object support means is introduced into a paint solution tank, and the transport object support means is then rotated and tilted slightly upward relative to the horizontal position where the transport object is drained of excess solution; and that the object is conveyed in the tilted state to the second-stage treatment section.

According to the eleventh invention, the transport object is introduced (dipped) into the paint solution tank and subjected to the desired electrodeposition coating (liquid treatment) by the rotation of the transport object support means into a pendant position in the first-stage treatment section. Excess paint solution can be adequately shed by the transport object as a result of the fact that the transport object support means is rotated and stopped at a position in which this transport object support means is slightly tilted relative to the horizontal and the transport object is kept in a tilted state, making it possible to prevent the solution from dripping during the transfer of the object to the next step and to create a less contaminated environment. The carriage can be subsequently conveyed from the first-stage treatment section to the second-stage treatment section, and because the transport object is tilted in this case, less time is needed to rotate the transport object support means downward into the pendant position. As a result, it is possible to reduce the residence time of the object in the second-stage treatment section, and thus to render the entire apparatus more efficient or to form a better electrodeposition coating by increasing the coating time of the second stage.

BRIEF DESCRIPTION OF THE DRAWINGS

FIG. 15 is a schematic plan view depicting a fixed route of the conveyance apparatus for use with carriages.

BEST MODE FOR CARRYING OUT THE INVENTION

Figure 1:
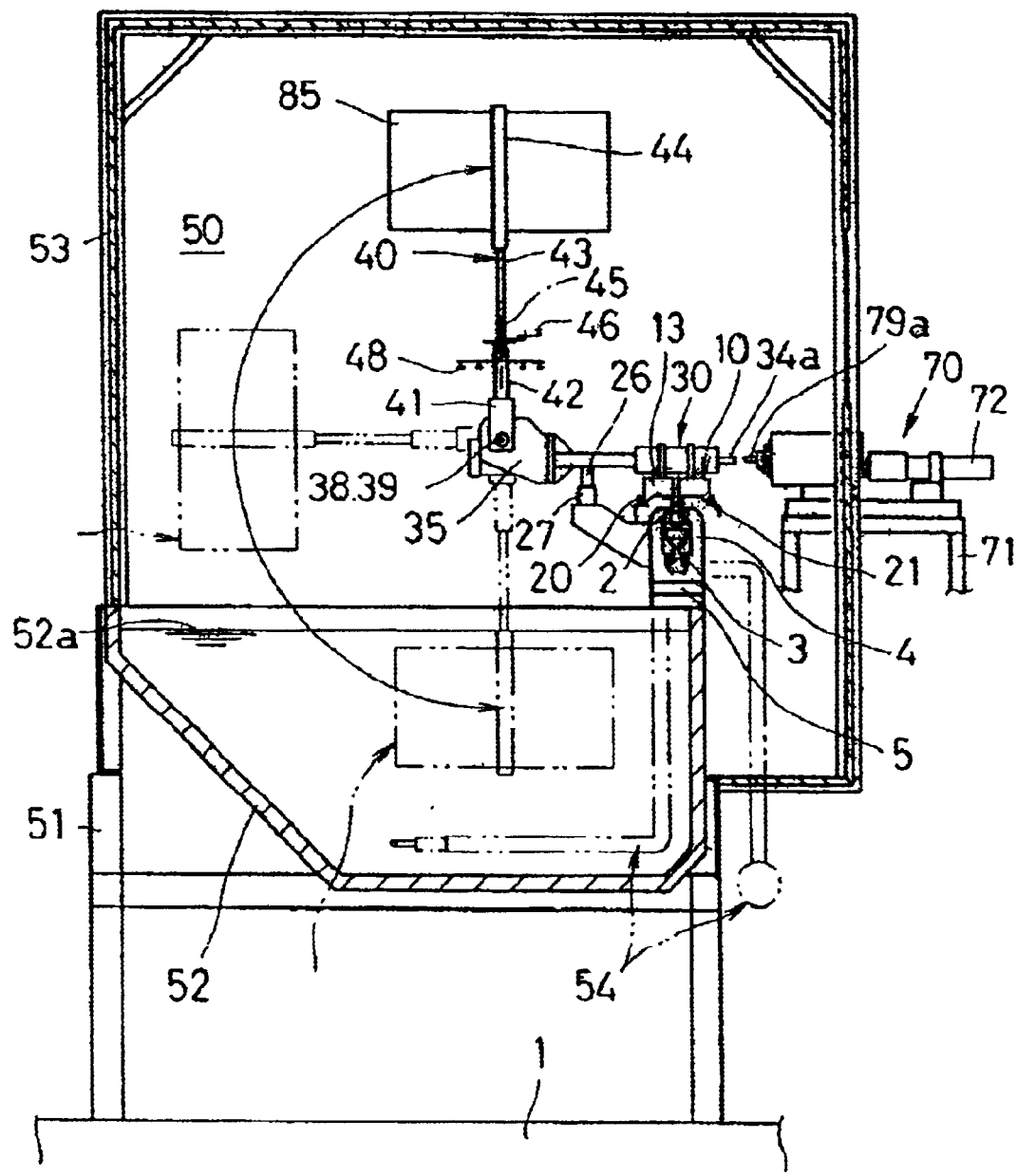
FIG. 1 is a longitudinal sectional front view of an electrodeposition chamber section of a conveyance apparatus for use with carriages according to a first embodiment of the present invention.
Figure 2:
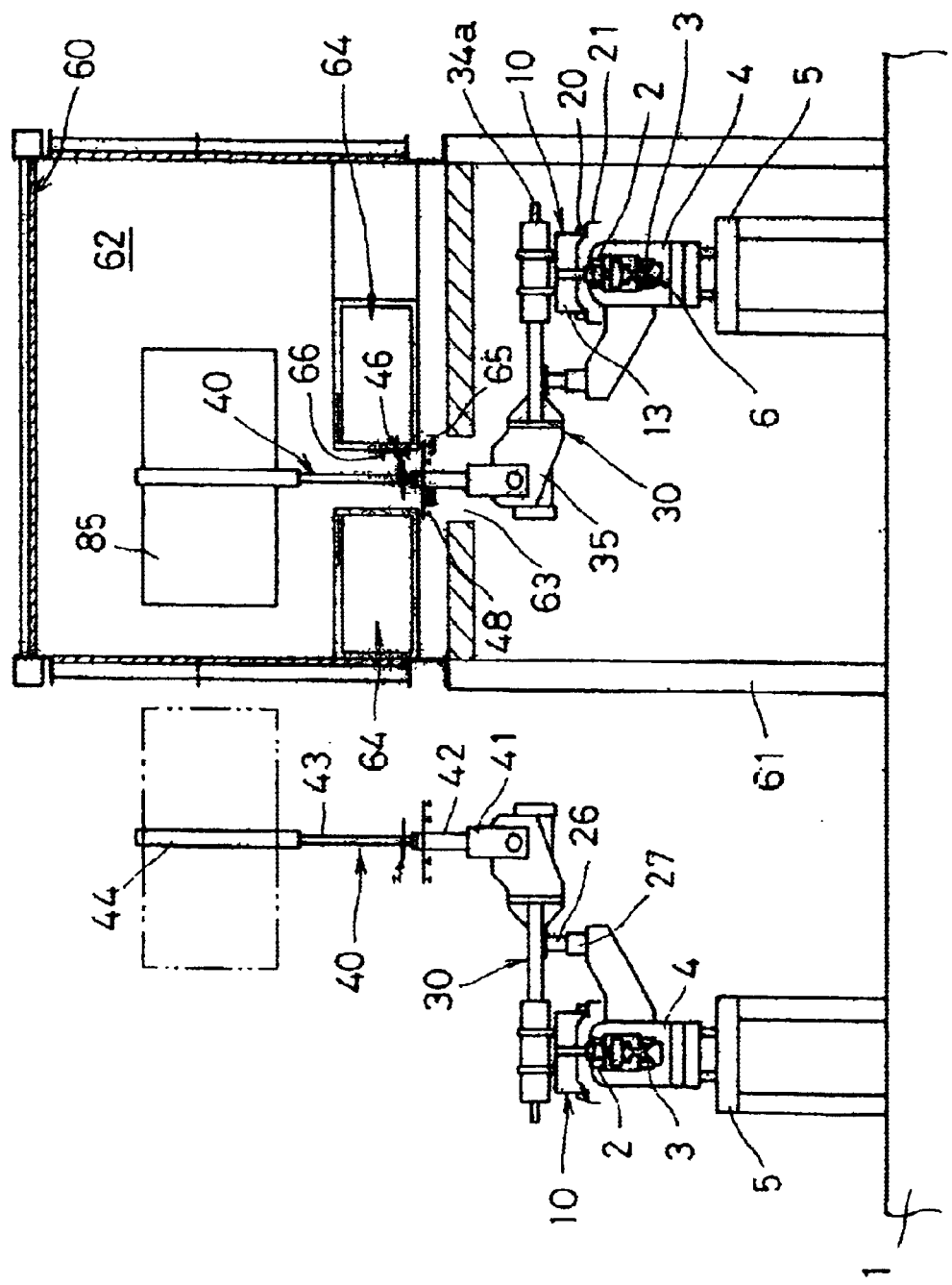
FIG. 2 is a longitudinal sectional front view of an drying furnace section of the conveyance apparatus for use with carriages.

The description that follows is based on FIGS. 1–5 and refers to a case in which a first embodiment of the present invention is adapted to a fixed route for coating (coating line).

A carriage rail device 2 (one possible example of a rail device) composed of a pair of rails (right and left rails) is disposed on a floor 1, and a driver rail device 3 composed of a pair of rails (right and left rails) is provided underneath the carriage rail device 2. The rail devices 2 and 3 are linked together at an appropriate distance by a yoke member 4 and are supported on the floor 1 by an adjustable floor attachment component 5. A driver (chain or the like) 6 supported and guided by the driver rail device 3 is provided with a transmission component (transmission projection) 7 at a prescribed pitch.

A carriage 10 guided and supported by the carriage rail device 2 and caused to travel along a fixed route 9 comprises two (a plurality of) front and back trolley devices (that is, a front trolley device 11 and a rear trolley device 12) supported and guided by the carriage rail device 2, a carriage body 13 linked between the trolley devices 11 and 12, and the like. In this arrangement, the trolley devices 11 and 12 and the carriage body 13 are linked together such that the components can rotate vertically and horizontally in relation to each other about a transverse axis 14 and a longitudinal axis 15.

Each of the trolley devices 11 and 12 is provided with a trolley wheel 16 supported and guided by the carriage rail device 2, and a guide wheel 17 guided along the inner surface of the carriage rail device 2. A slave component (slave projection) 18 detachable from the transmission component 7 of the driver 6 is provided underneath the front trolley device 11, and a cam 19 for forcibly disengaging and storing the slave component 18 of the approaching carriage 10 is provided underneath the rear trolley device 12.

Guide rollers 20 spaced apart in the longitudinal direction are provided on both sides underneath the carriage body 13, and a rail 21 for supporting and guiding these guide rollers 20 is secured on the floor 1 by an appropriate support structure (not shown).

A rotary control means 30 extending in the transverse direction from the carriage body 13 is provided to the carriage 10, and a transport object support means 40 capable of rotating about an anteroposterior axis 39 that extends along the fixed route 9 is provided to the free end of the rotary control means 30.

Specifically, a transverse bearing 32 is mounted on the carriage body 13 via a bracket 31, and a barrel 33 is fitted through the bearing 32 and linked to one end thereof. A control shaft 34 is inserted into the barrel 33 through the bearing 32. The control shaft 34 projects from the other end of the bearing 32, and a splined cylindrical portion 34a is formed on the other end thereof.

A gearbox 35 is fixed to one end of the barrel 33, and this gearbox 35 contains a worm gear mechanism 36. The input shaft 37 of the worm gear mechanism 36 is linked in an interlocking fashion to one end of the control shaft 34, and the output shaft 38 is allowed to rotate about the anteroposterior axis 39. The above-described components 31–38 are examples of components that constitute the rotary control means 30.

The transport object support means 40 may, for example, comprise a gate-shaped bracket 41 fixed between the longitudinally extending ends of the output shaft 38, a cylindrical base 42 whose lower end is fixed to the top plate of the gate-shaped bracket 41, a rod-shaped (or cylindrical) distal portion 43 whose lower end is fitted into the base 42, a support 44 provided to the free end of the distal portion 43, and the like.

The transport object support means 40 can thus rotate about the anteroposterior axis 39 in the free end section of the rotary control means 30, and the distal portion 43 can turn relative to the base 42 about a longitudinal axis 45. The distal portion 43 is turned about the longitudinal axis 45 by the application of a turning force to the distal portion 43 via a roller 46 or the like, and the turning position is maintained by a detachable stopper component 47. The base 42 is provided with a positioning roller 48 for stabilizing the turning movement. The above-described components 41–48 are examples of components that constitute the transport object support means 40.

The rotary control means 30 is supported and guided by a guide rail laid along the carriage rail device 2. Specifically, a downwardly extending bracket 25 is linked to the midportion of the barrel 33 in the rotary control means 30, and a freely rotating guide roller 26 is provided to the bracket 25 via a transverse pin. A guide rail 27 for supporting and guiding this guide roller 26 is laid along the carriage rail device 2, and the guide rail 27 is fixed to the link 28 of the yoke member 4.

The fixed route 9 passes through a treatment section. In the example shown, the treatment section comprises an electrodeposition chamber 50, a drying furnace 60, and a final drying furnace 68. Specifically, the electrodeposition chamber 50 is defined as a compartment by placing a paint solution tank 52 on the floor 1 via a frame 51 and providing a walled structure 53 (shaped as a gate in cross section) to form an enclosure for the space above the paint solution tank 52. The paint solution tank 52 is filled with a paint solution 52a by an automatic feeding means 54 or the like in a manner such that a constant level is always maintained.

The carriage 10 can move through the electrodeposition chamber 50 because of the presence of the through-going fixed route 9. In this arrangement, the rotary control means 30 is rotated and the transport object support means 40 is caused to rotate into a pendant position while the carriage 10 is stopped inside the electrodeposition chamber 50, whereby a transport object 85 supported on the free end of the transport object support means 40 is introduced (dipped) into the paint solution 52a in the paint solution tank 52 and coated by electrodeposition (liquid treatment) in an appropriate manner.

Following the desired electrodeposition coating, the transport object support means 40 is rotated into a horizontal position by the rotation of the rotary control means 30 to drain the transport object 85 supported on the transport object support means 40 of excess solution. After sufficient drainage, the transport object support means 40 is rotated and oriented vertically by the rotation of the rotary control means 30, whereby the transport object 85 supported on the transport object support means 40 is set above the carriage 10.

The drying furnace 60 is mounted on the floor 1 via a frame 61 such that a box-shape drying chamber 62 is formed. An opening 63 for passing the vertically oriented transport object support means 40 is formed in the bottom wall of the drying furnace 60, and a drying means 64 is provided near the opening 63 in the drying chamber 62, whereby the transport object 85 supported on the transport object support means 40 is transported through the drying chamber 62 and is dried there.

Also disposed inside the drying chamber 62 are a turning guide rail 65 for guiding the roller 46 and turning the distal portion 43, and a positioning guide rail 66 for guiding the positioning roller 48 and positioning the base 42 in order to stabilize the turning movement. The final drying furnace 68 has the same structure.

A rotary drive means 70 detachable from the rotary control means 30 is provided in the area occupied by the electrodeposition chamber 50, which is an example of an apparatus disposed at a prescribed location along the fixed route 9. Specifically, the walled structure 53 is provided with a frame 71 that goes through one of the side walls, and a rotary driver 72 composed of a motor or the like is mounted on the external portion of the frame 71. The output shaft 73 of the rotary driver 72 extends inward and is linked in an interlocking fashion with a cylindrical shaft 75 via a coupling 74 or the like.

The cylindrical shaft 75 is rotatably supported via a bearing 76 or the like on a support platform 77 facing the frame 71, and the tip of the cylindrical shaft 75 is linked, for example, to a drive shaft 79 via a spline structure 78 to form a telescopic and integrally rotating structure. The drive shaft 79 is also rotatably and telescopically supported on the support platform 77 via a bearing 80 or the like. The support platform 77 is provided with a telescoping means (cylinder device or the like) 81 for expanding and contracting the drive shaft 79 while allowing this drive shaft 79 to rotate.

The inner end portion of the drive shaft 79 is fashioned into a splined shank 79a, and this splined shank 79a can form a spline fit with the splined cylindrical portion 34a of the control shaft 34. The above-described components 71–81 are examples of components that constitute the rotary drive means 70. The rotary drive means 70 can be provided at a prescribed location along the regular route section or the like in addition to the area occupied by the electrodeposition chamber 50, as shown, for example, in FIG. 5.

The operation of the first embodiment will now be described.

Figure 3:
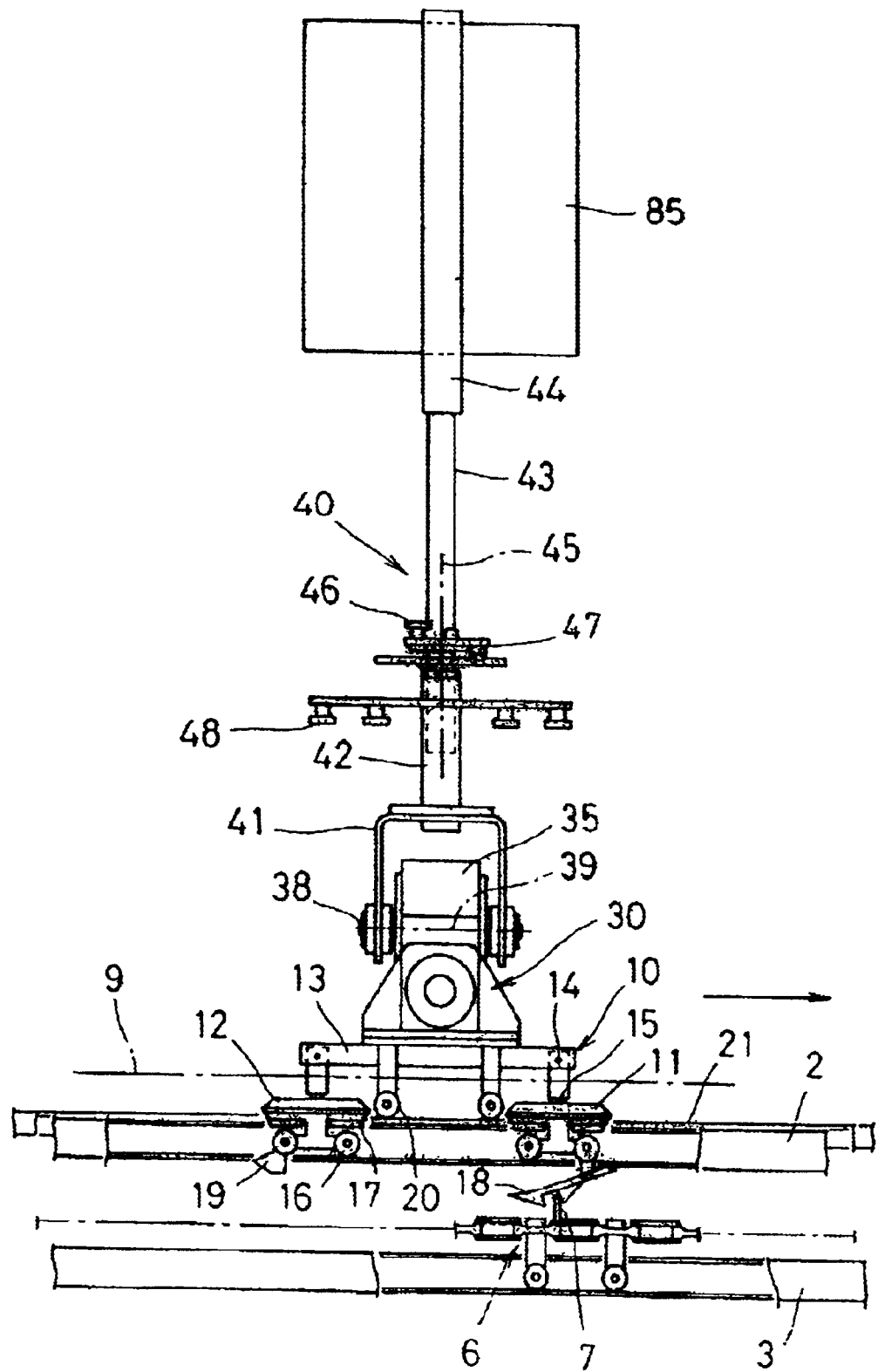
FIG. 3 is a cutaway side view of a regular route section of the conveyance apparatus for use with carriages.
Figure 4:
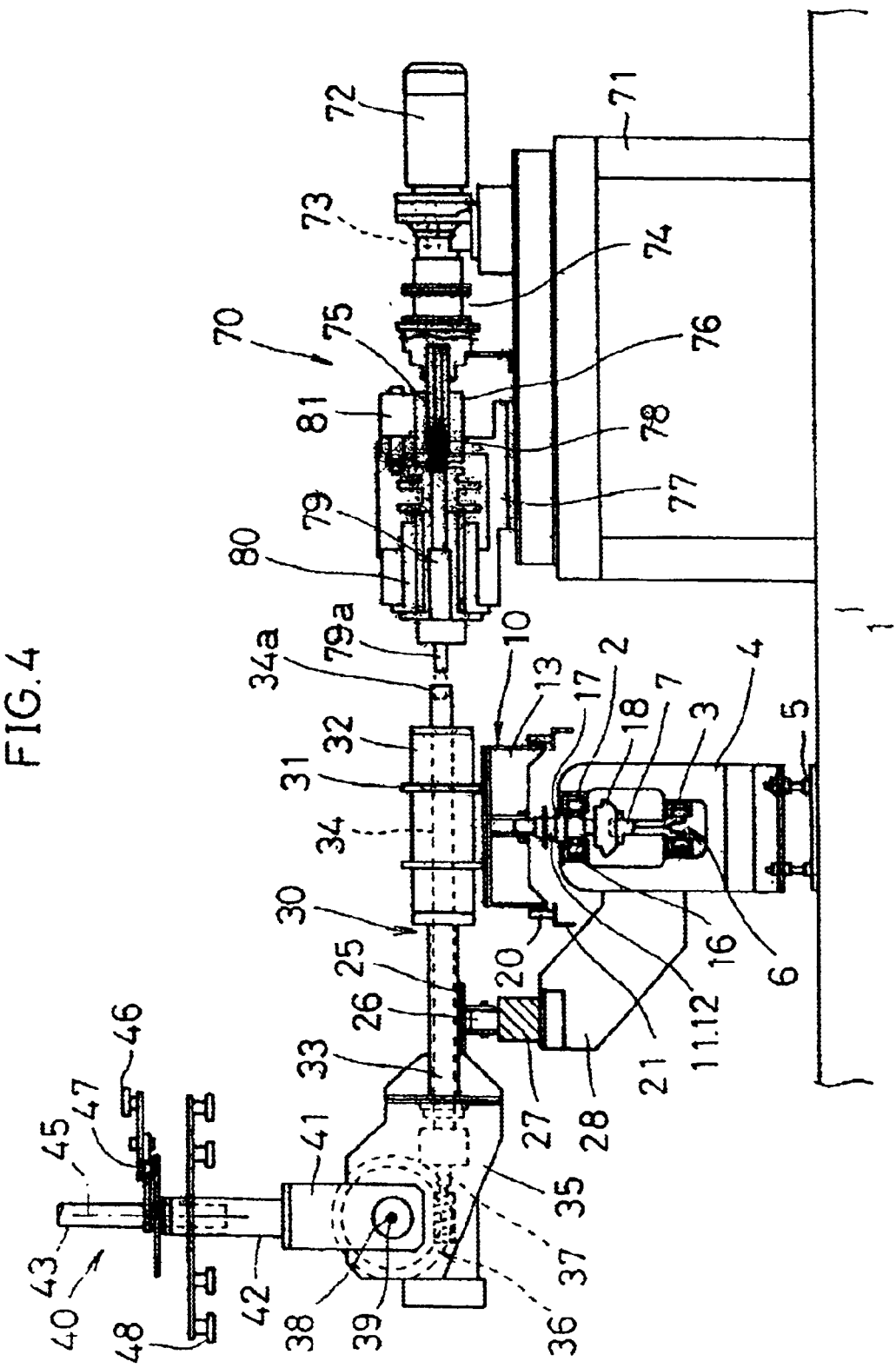
FIG. 4 is a cutaway front view of the regular route section of the conveyance apparatus for use with carriages.
Figure 5:
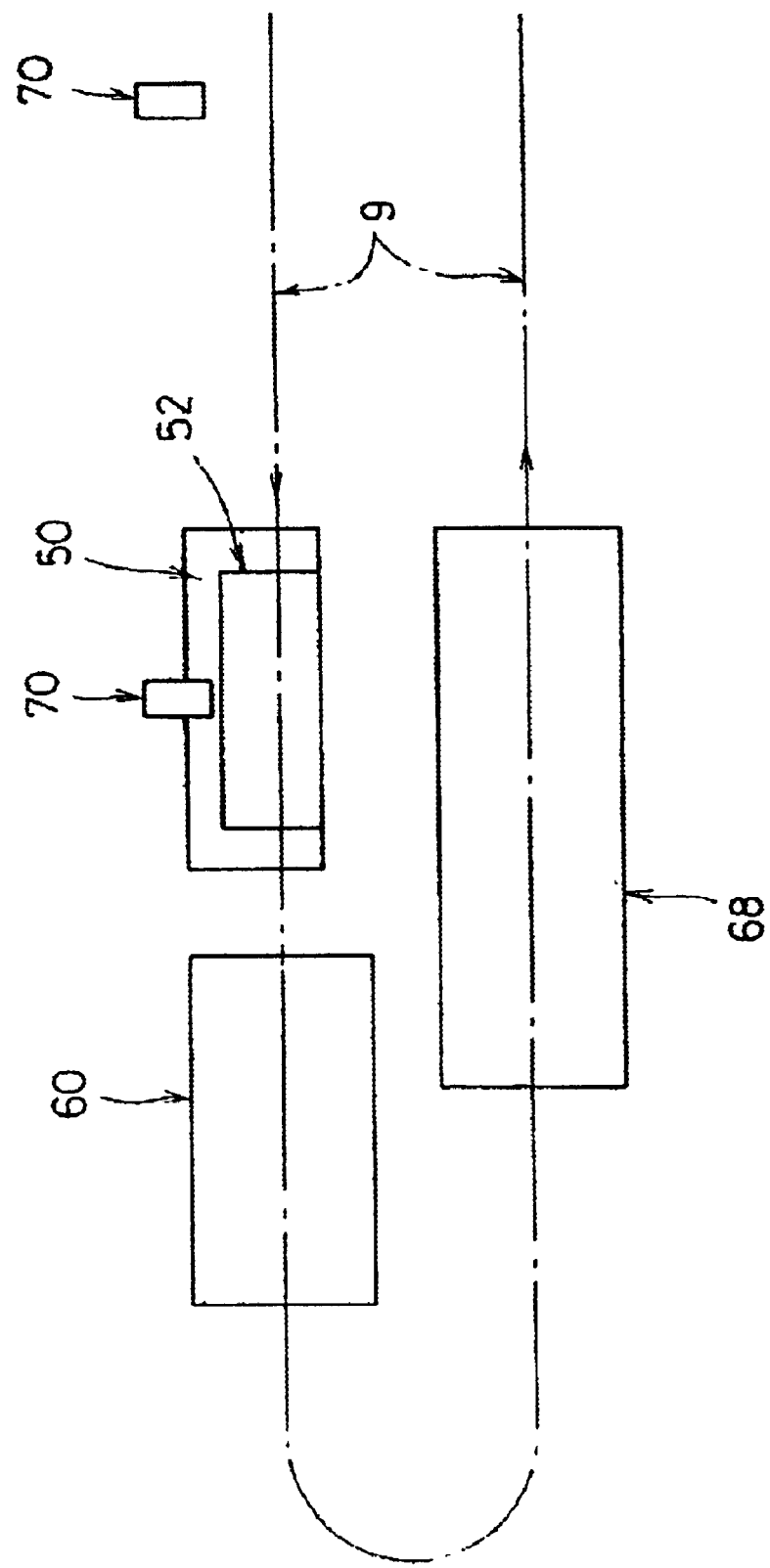
FIG. 5 is a schematic plan view a fixed route for the conveyance apparatus for use with carriages.

Commonly, the transport object support means 40 is rotated into a vertical position, and while the transport object 85 supported by the transport object support means 40 is disposed above the carriage 10, the driver 6 exerts a driving force and causes the carriage 10 to move along the fixed route 9 as a result of the fact that the trolley wheels 16 of the trolley devices 11 and 12 are supported and guided by the carriage rail device 2 and that the transmission component 7 of the driver 6 is caused to engage the slave component 18, as shown in FIGS. 3 and 4.

In the process, the carriage 10 moves without swaying in the rolling direction or the like as a result of the fact that the guide wheel 20 (*1) is guided along the inwardly-oriented surface of the carriage rail device 2, and the guide rollers 20 are supported and guided by the rail 21. In addition, the guide roller 26 disposed on the side of the rotary control means 30 is supported and guided by the guide rail 27, allowing the transport object support means 40 to rotate or the carriage 10 to move smoothly without causing the transport object support means 40 to sway in the vertical direction. The transport object 85 can thus be treated accurately and efficiently in a variety of ways.

The carriage 10 is moved smoothly and efficiently as a result of the fact that the links between the carriage body 13 and the trolley devices 11 and 12 are rotated relative to the transverse axis 14 and longitudinal axis 15 during the movement of the carriage along the fixed route 9, and particularly during the movement of the carriage along a transverse or vertical curved route portion.

The carriage 10 moving in this manner is stopped at a prescribed location inside the electrodeposition chamber 50, as shown in FIG. 1. The carriage, stopped by a stopper means (not shown) acting on the slave component 18, disengages from the transmission component 7 and comes to a stop (stopper action). The splined cylindrical portion 34a of the rotary control means 30 is thereby positioned and stopped along the same axis as the splined shank 79a of the rotary drive means 70.

In this state, the rotary control means 30 is rotated by the rotary drive means 70. Specifically, the drive shaft 79 of the rotary drive means 70 is first extended inward by the extension of the telescoping means 81, and the splined shank 79a formed in the inner end portion of the drive shaft 79 is thereby caused to form a spline fit with the splined cylindrical portion 34a provided to the control shaft 34.

The rotary driver 72 is then rotatably driven, and the rotation of the output shaft 73 is transmitted to the output shaft 38 via the coupling 74, cylindrical shaft 75, spline structure 78, drive shaft 79, control shaft 34, input shaft 37, and worm gear mechanism 36, whereby the transport object support means 40 is rotated downward about the anteroposterior axis 39 and brought into a pendant state. The transport object 85 supported by the support 44 at the free end of the transport object support means 40 is thereby introduced (dipped) into the paint solution 52a in the paint solution tank 52, as shown by imaginary line (a) in FIG. 1, resulting in the desired electrodeposition coating (liquid treatment).

After the desired electrodeposition coating has been performed in this manner, the rotary drive means 70 is rotated in the opposite direction, whereby the transport object support means 40 is upwardly rotated about the anteroposterior axis 39. The upward rotation is stopped in an intermediate state in which the transport object support means 40 is oriented sideways, whereby the transport object 85 supported on the transport object support means 40 is oriented sideways in the manner shown by imaginary line (b) in FIG. 1. This allows the transport object 85 to be drained of the paint solution 52a in an adequate manner.

After sufficient drainage, the rotary drive means 70 is urged in the opposite direction, whereby the transport object support means 40 is again upwardly rotated about the anteroposterior axis 39. As a result of this rotary operation, the transport object support means 40 is rotated into a vertical position, causing the transport object 85 supported by the transport object support means 40 to position itself above the carriage 10, as shown by a solid line in FIG. 1.

The carriage 10 is subsequently allowed to move again and to leave the electrodeposition chamber 50 by the release of the stopper means. The carriage 10 reaches the area occupied by the drying furnace 60 and passes underneath the drying chamber 62, whereby the transport object 85 is introduced into the drying chamber 62 by the transport object support means 40. The transport object 85 travels in this state through the drying chamber 62, and the desired drying treatment is performed by the drying means 64 in the process.

At this time, the base 42 of the transport object support means 40 is locked in place by the positioning and guiding of the positioning roller 48 with the aid of the positioning guide rail 66, and the roller 46 is guided and subjected to a turning force by means of the turning guide rail 65 in this state. As a result, the distal portion 43 of the positioned base 42 is stably turned about the longitudinal axis 45, whereby the transport object 85 supported by the distal portion 43 is uniformly dried while being turned about the longitudinal axis 45.

The transport object 85 thus dried in the drying furnace 60 is removed from the drying chamber 62 and introduced into the drying chamber of the final drying furnace 68, where the desired final drying treatment is performed by a drying means in the same manner as above. The treated transport object 85 is then removed from the transport object support means 40 in the regular route section of the fixed route 9, and a new transport object 85 is loaded.

The description that follows is based on FIGS. 6–15 and refers to a case in which a second embodiment of the present invention is adapted to a fixed coating route (coating line).

A carriage rail device 102 (an example of a rail device) composed of a pair of rails (right and left rails) is disposed on a floor 101, and a driver rail device 103 composed of a pair of rails (right and left rails) is provided underneath the carriage rail device 102, as shown in FIGS. 6–10. The rail devices 102 and 103 are linked together at an appropriate distance by a yoke member 104 and are supported on a frame or the floor 101 by an adjustable floor attachment component 105. A driver (chain or the like) 106 supported and guided by the driver rail device 103 is provided with a transmission component (transmission projection) 107 at a prescribed pitch.

A carriage 110 guided and supported by the carriage rail device 102 and caused to travel along an endless fixed route 109 comprises two (a plurality of) front and back trolley devices (that is, a front trolley device 111 and a rear trolley device 112) supported and guided by the carriage rail device 102, a carriage body 113 linked between the trolley devices 111 and 112, and the like. In this arrangement, the trolley devices 111 and 112 and the carriage body 113 are linked together such that the components can rotate vertically and horizontally in relation to each other about a transverse axis 114 and a longitudinal axis 115.

Each of the trolley devices 111 and 112 is provided with a trolley wheel 116 supported and guided by the carriage rail device 102, and a guide wheel 117 guided along the inner surface of the carriage rail device 102. A slave component (slave projection) 118 detachable from the transmission component 107 of the driver 106 is provided underneath the front trolley device 111, and a cam 119 for forcibly disengaging and storing the slave component 118 of the approaching carriage 110 is provided underneath the rear trolley device 112. The above-described components 111–119 are examples of components that constitute the carriage 110.

A rotary control means 130 extending to the left and right from the carriage body 113 is provided to the carriage 110, and a transport object support means 140 capable of rotating about an anteroposterior axis 139 extending along the fixed route 109 is provided to the free end of the rotary control means 130.

Specifically, transversely oriented bearings 131 and 132 are mounted on the left and right sides of the carriage body 113, and a control shaft 133 is inserted into the carriage body 113 through the bearings 131 and 132. The control shaft 133 projects from the other end of the bearing 132, and a driven sprocket 134 is provided to the other end thereof.

A gearbox 135 is fixed to one end of the bearing 131, and this gearbox 135 contains a worm gear mechanism 136. The input shaft 137 of the worm gear mechanism 136 is linked in an interlocking fashion to one end of the control shaft 133, and the output shaft 138 is allowed to rotate about the anteroposterior axis 139. The above-described components 131–138 are examples of components that constitute the rotary control means 130.

The transport object support means 140 may, for example, comprise a bracket 141 fixed between the anteroposteriorly extending ends of the output shaft 138, a vertical shaft 142 whose lower end is fixed to the bracket 141, a cylindrical component 143 rotatably fitted on the vertical shaft 142, a support 144 provided to the free end of the cylindrical component 143, and the like. The transport object support means 140 can thus rotate about the anteroposterior axis 139 in the free end section of the rotary control means 130, and the cylindrical component 143 can turn relative to the vertical shaft 142 about a longitudinal axis 145.

The cylindrical component 143 is turned about the longitudinal axis 145 by the application of a turning force to a turning wheel (sprocket) 146 disposed in the midportion of the cylindrical component 143 or to a turning roller 147 disposed facing the turning wheel 146. A transport object 148 is disposed in a turning position in the area occupied by the turning wheel 146, and the free end portion of the cylindrical component 143 is provided with a cover 149 for covering the upper parts of the gearbox 135 and the like. The above-described components 141–149 are examples of components that constitute the transport object support means 140.

In this case, the turning position of the transport object support means 140 is maintained by a stopping device 150. Specifically, a discoid stopper 151 is provided in the top portion of the cylindrical component 143, and stopping indents 152 are formed in a plurality of locations (for example, four stoppers at 90-degree intervals) along the external periphery of the stopper 151. A link 154 is pivotably mounted via a vertical pin 153 on the carriage body 113, a catch 155 capable of engaging the stopping indents 152 is mounted on the base end of the link 154, and the free end thereof is provided with a cam roller 156.

A spring 157 (not shown) for pivoting the link 154 in order to cause the catch 155 to be engaged by a stopping indent 152 is provided between the carriage body 113 and the link 154. The above-described components 151–157 are examples of components that constitute the stopping device 150. Turn sensors 158 for detecting the transport object 148 or cam rails 159 for guiding the cam roller 156 are provided at prescribed locations (a plurality of locations) in a first-stage electrodeposition chamber, second-stage electrodeposition chamber (both will be described below), or other section of the fixed route 109.

The rotary control means 130 is supported and guided by a guide rail laid along the carriage rail device 102. Specifically, an anteroposteriorly oriented support member 120 is linked to the carriage body 113, brackets 121 are extended downward from the left and right ends of the support member 120, and guide rollers 122 are mounted in a freely rotatable fashion in the brackets 121 with the aid of transversely oriented pins.

A guide rail 123 for supporting and guiding the guide rollers 122 is laid along the carriage rail device 2 (*2) between the carriage rail device 102 and the anteroposterior axis 139, and the guide rail 123 is fixed to the yoke member 104.

Figure 6:
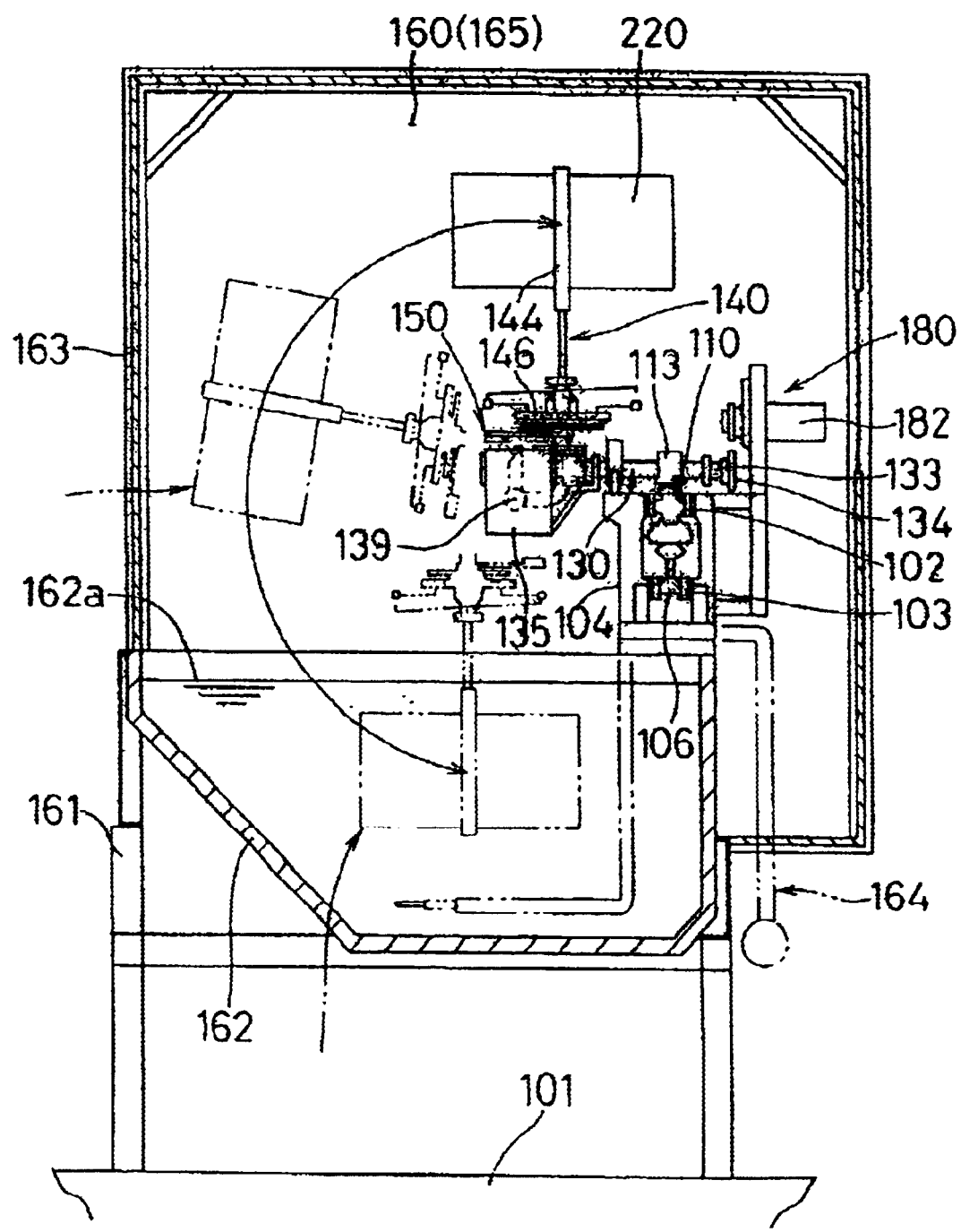
FIG. 6 is a longitudinal sectional rear view of an electrodeposition chamber section of a conveyance apparatus for use with carriages according to a second embodiment of the present invention.
Figure 7:
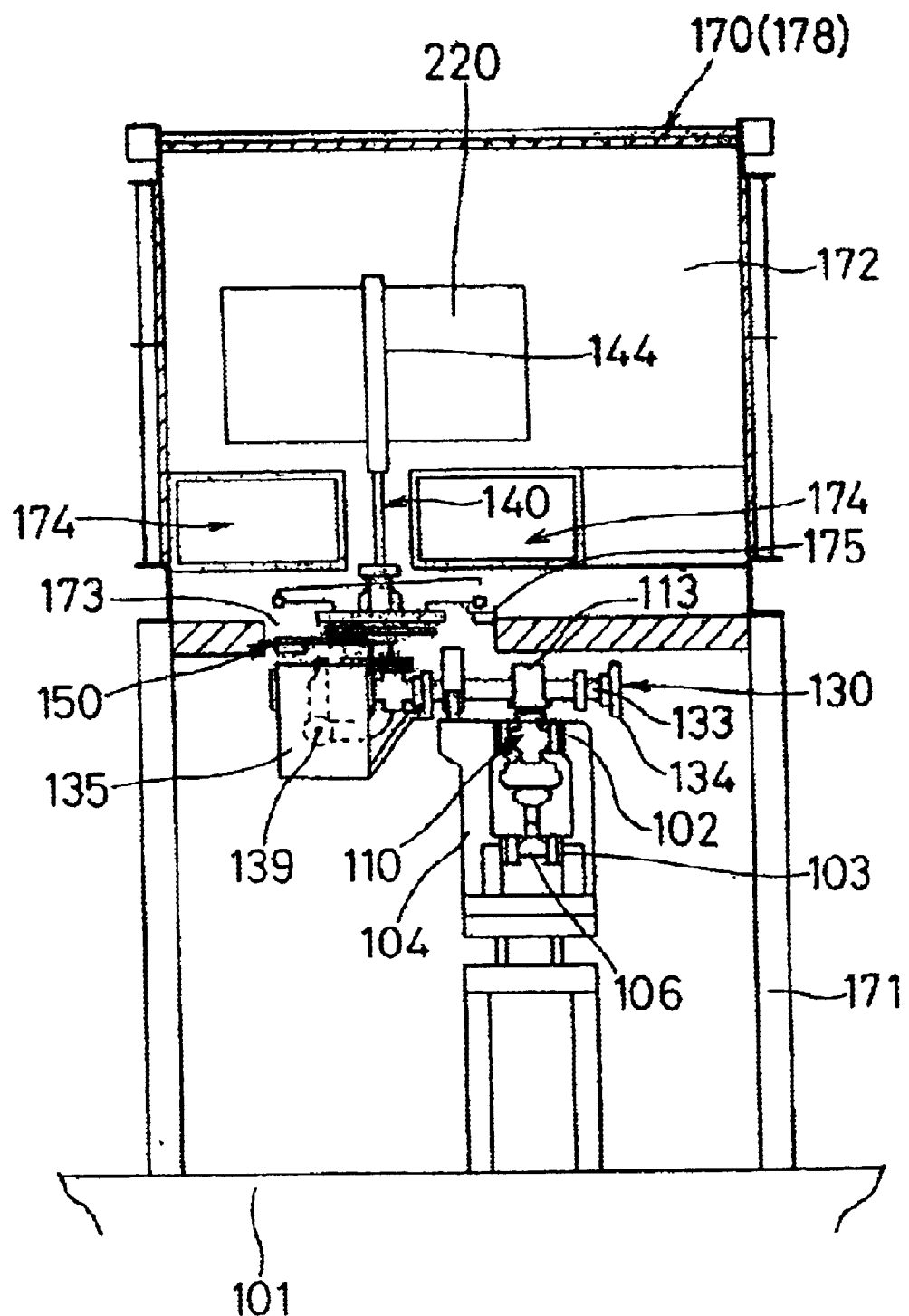
FIG. 7 is a longitudinal sectional rear view of a drying furnace section of the conveyance apparatus for use with carriages.

The fixed route 109 passes through a treatment section, as shown in FIGS. 6, 7, and 15. In the example shown, the treatment section comprises a first-stage electrodeposition chamber 160, a second-stage electrodeposition chamber 165, a drying furnace 170, and a final drying furnace 178. Specifically, in the identically configured first-stage electrodeposition chamber 160 and second-stage electrodeposition chamber 165, a paint solution tank 162 is mounted on a floor 101 via a frame 161, and a walled structure 163 (shaped as a gate in cross section) is provided to form an enclosure for the space above the paint solution tank 162, whereby the first-stage electrodeposition chamber 160 or second-stage electrodeposition chamber 165 is formed as an isolated compartment. The paint solution tank 162 is filled with a paint solution 162a by an automatic feeding means 164 or the like in a manner such that a constant level is always maintained.

The carriage 110 can move through the two electrodeposition chambers 160 and 165 because of the presence of the through-going fixed route 109. In this arrangement, the rotary control means 130 is rotated, and the transport object support means 140 is rotated into a pendant position while the carriage 110 is stopped inside the electrodeposition chamber 160 or 165, whereby a transport object 220 supported on the free end of the transport object support means 140 is introduced (dipped) into the paint solution 162a in the paint solution tank 162 and coated by electrodeposition (liquid treatment) in an appropriate manner.

Following the desired electrodeposition coating in the first-stage electrodeposition chamber 160, the transport object support means 140 is rotated and tilted slightly upward relative to the horizontal by the rotation of the rotary control means 130 to allow the transport object 220 supported on the transport object support means 140 to be drained of excess solution. After sufficient drainage, the transport object, while still tilted, is conveyed to the second-stage electrodeposition chamber 165.

The drying furnace 170 is mounted on the floor 101 via a frame 171 such that a box-shape drying chamber 172 is formed. An opening 173 for accommodating the vertically oriented transport object support means 140 is formed as a slit in the bottom wall of the drying furnace 170, and a drying means 174 is provided near the opening 173 in the drying chamber 172, whereby the transport object 220 supported on the transport object support means 140 is transported through the drying chamber 172 and is dried there.

Also disposed inside the drying chamber 170 (*3) are a turning guide rail 175 for guiding the turning roller 147 and turning the cylindrical component 143, the above-described turn sensors 158, the cam rail 159, or the like. The final drying furnace 178 has the same structure.

A rotary drive means 180 detachable from the control shaft 133 of the rotary control means 130 in the external peripheral direction is provided in the area occupied by the first-stage electrodeposition chamber 160 or second-stage electrodeposition chamber 165, which is an example of an apparatus disposed along the fixed route 109, as shown in FIGS. 6, 8, 10, 11, 13, and 15.

Specifically, the walled structure 163 is provided with an internally disposed frame 181, and a rotary driver 182 comprising a reversible drive motor or the like is mounted on the frame 181. The output shaft 183 of the rotary driver 182 extends inward in the transverse direction, and the inside end thereof is provided with a drive wheel 184. A plate 188, which is fitted on the output shaft 183 and disposed between the drive wheel 184 and the rotary driver carriage body, is rotatably mounted at one end, and a driven wheel 186 is mounted at the other longitudinally extending end of the plate 188 via a positionally adjustable spindle 185 in a freely rotatable manner.

A chain 187 is extended between the drive wheel 184 and driven wheel 186. In addition, a cylinder device 189 for raising and lowering the plate 188 while rotating it about the output shaft 183 is provided between the frame 181 and plate 188. As a result, the chain 187 is caused to engage from above the driven sprocket 134 on the control shaft 133 of the rotary control means 130 by the lowering and rotation of the plate 188, and the chain 187 is caused to move upward and disengage from the driven sprocket 134 by the lifting and rotation of the plate 188.

The above-described components 181–189 are examples of components constituting the rotary drive means 180 that can be connected to or disconnected from the control shaft 133 by an upward advance or retraction (in the external peripheral direction). The rotary drive means 180 can be provided at a prescribed location of a regular route section or the like in addition to the area occupied by the above-described first-stage electrodeposition chamber 160 or second-stage electrodeposition chamber 165, as shown, for example, in FIG. 15.

A turning means 190 for turning the transport object support means 140 (rotated sideways about the anteroposterior axis 139) about the longitudinal axis 145 is provided to a route section downstream from the final drying furnace 178 as an example of a prescribed location for the fixed route 109, as shown in FIGS. 8 and 13–15.

Specifically, a frame 191 is provided opposite the rotary drive means 180 on the other side of the fixed route 109 inside the walled structure, and a rotary driver 192 comprising a reversible drive motor or the like is mounted on the frame 191. The output shaft 193 of the rotary driver 192 extends outward in the transverse direction, and the outside end thereof is provided with a drive wheel 194. A transversely oriented drive shaft 196 is rotatably mounted via a bearing 195 on the frame 191 a short distance away from the rotary driver 192, and a driven wheel 197 and a lateral wheel 198 are mounted on the drive shaft 196 A transmission chain 199 is extended between the driven wheel 197 and drive wheel 194.

One end of an arm plate 200 is pivotably fitted over the drive shaft 196, and the other anteroposteriorly extending end of the arm plate 200 is provided with another lateral wheel 202 via a positionally adjustable, freely rotatable shaft 201. A chain 203 is extended between the lateral wheels 198 and 202. In addition, a cylinder device 204 for raising and lowering the arm plate 200 while rotating it about the drive shaft 196 is provided between the frame 191 and arm plate 200.

Consequently, the chain 203 can be caused to engage from below the turning wheel 146 rotated sideways together with the cylindrical component 143, and the transport object support means 140 can be turned about the longitudinal axis 145 by the sideways rotation of the transport object support means 140 about the anteroposterior axis 139 and by the lifting and rotation of the arm plate 200 while the stopping device 150 is kept in a disengaged state. The chain 203 can also be caused to move downward and disengage from the turning wheel 146 by the lowering and rotation of the arm plate 200.

The frame 191 is also provided with a cradle 205 for receiving the descending and rotating arm plate 200, a rotation sensor (not shown) for the arm plate 200, or the like. The above-described components 191–205 are examples of components that constitute the turning means 190 for allowing the transport object support means 140 rotated sideways about the anteroposterior axis 139 to be further turned about the longitudinal axis 145.

A rotary drive means 180 or a spray painting means 208 for spraying paint onto the transport object 220 may be provided in the location reserved for the turning means 190.

Figure 10:
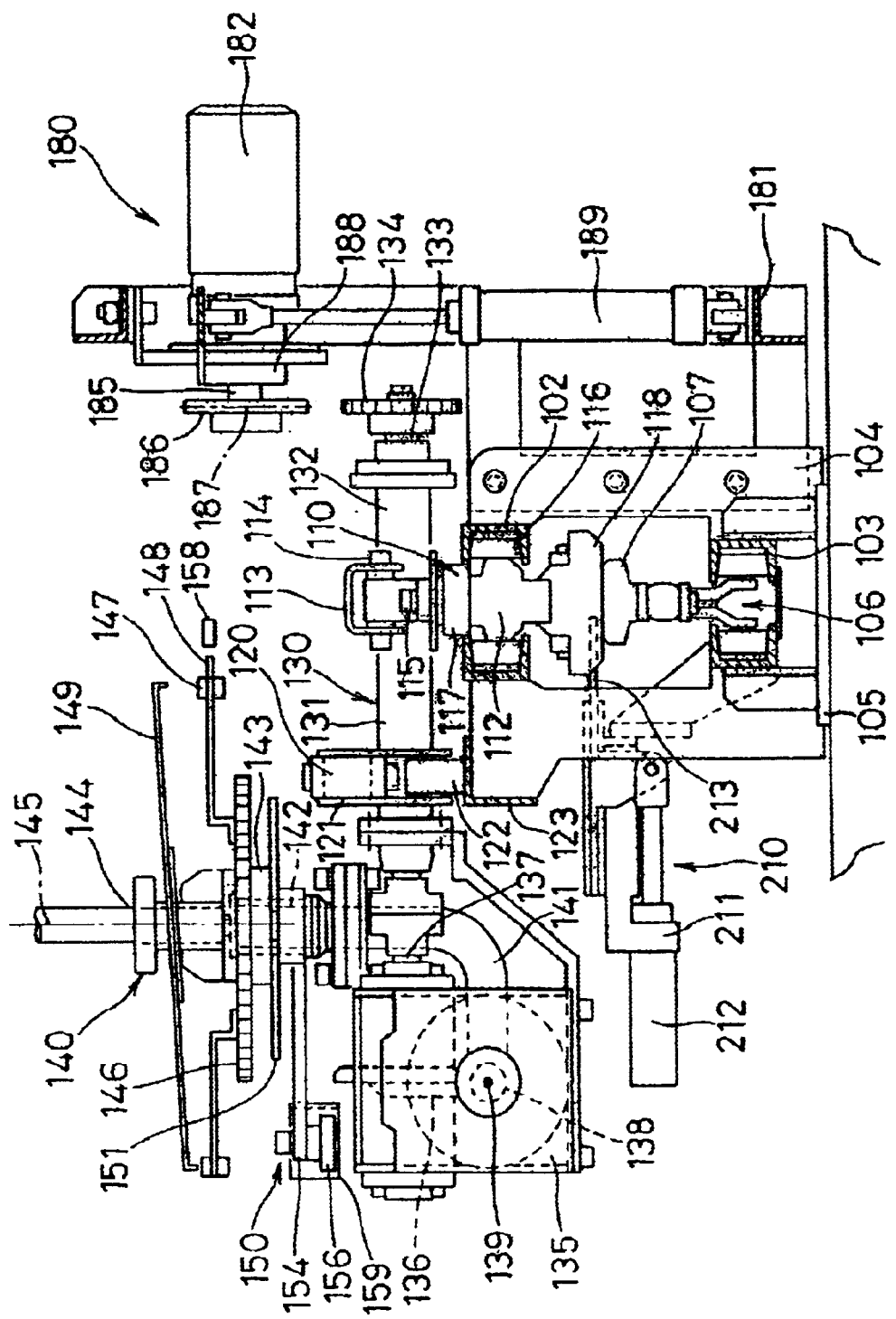
FIG. 10 is a cutaway rear view of the regular route section of the conveyance apparatus for use with carriages.
Figure 13:
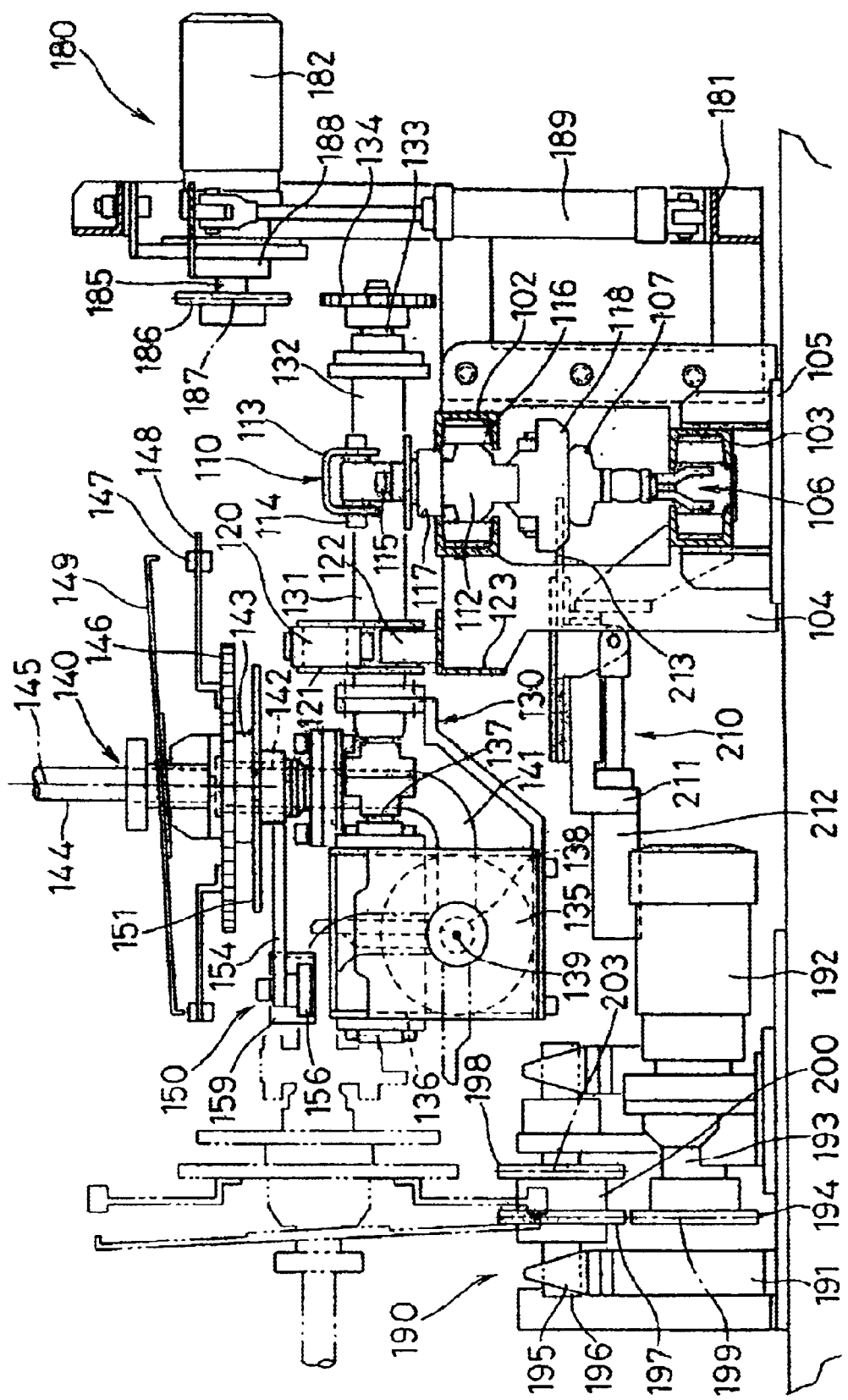
FIG. 13 is a cutaway rear view of a turning means in the conveyance apparatus for use with carriages.

Stopper means 210 for the carriage 110 are provided at prescribed locations (a plurality of locations) in the first-stage electrodeposition chamber 160, the second-stage electrodeposition chamber 165, the area occupied by the turning means 190, and other sections of the fixed route 109, as shown in FIGS. 10 and 13. Specifically, a bracket 211 is attached to the driver rail device 103 on the side opposite from the rotary drive means 180 on the other side of the fixed route 109, and a carriage body for a transversely oriented cylinder device 212 is mounted in the bracket 211.

A control element 213 shaped as a cam disc is linked to the piston rod of the cylinder device 212, the control element 213 can extend toward the front of the slave component 118 in the front trolley device 111, the slave component 118 is caused by this extension to disengage from the transmission component 107, and the front trolley device-111 is locked in place. The above-described components 211–213 are examples of components that constitute the stopper means 210.

The operation of the second embodiment will now be described.

Figure 9:
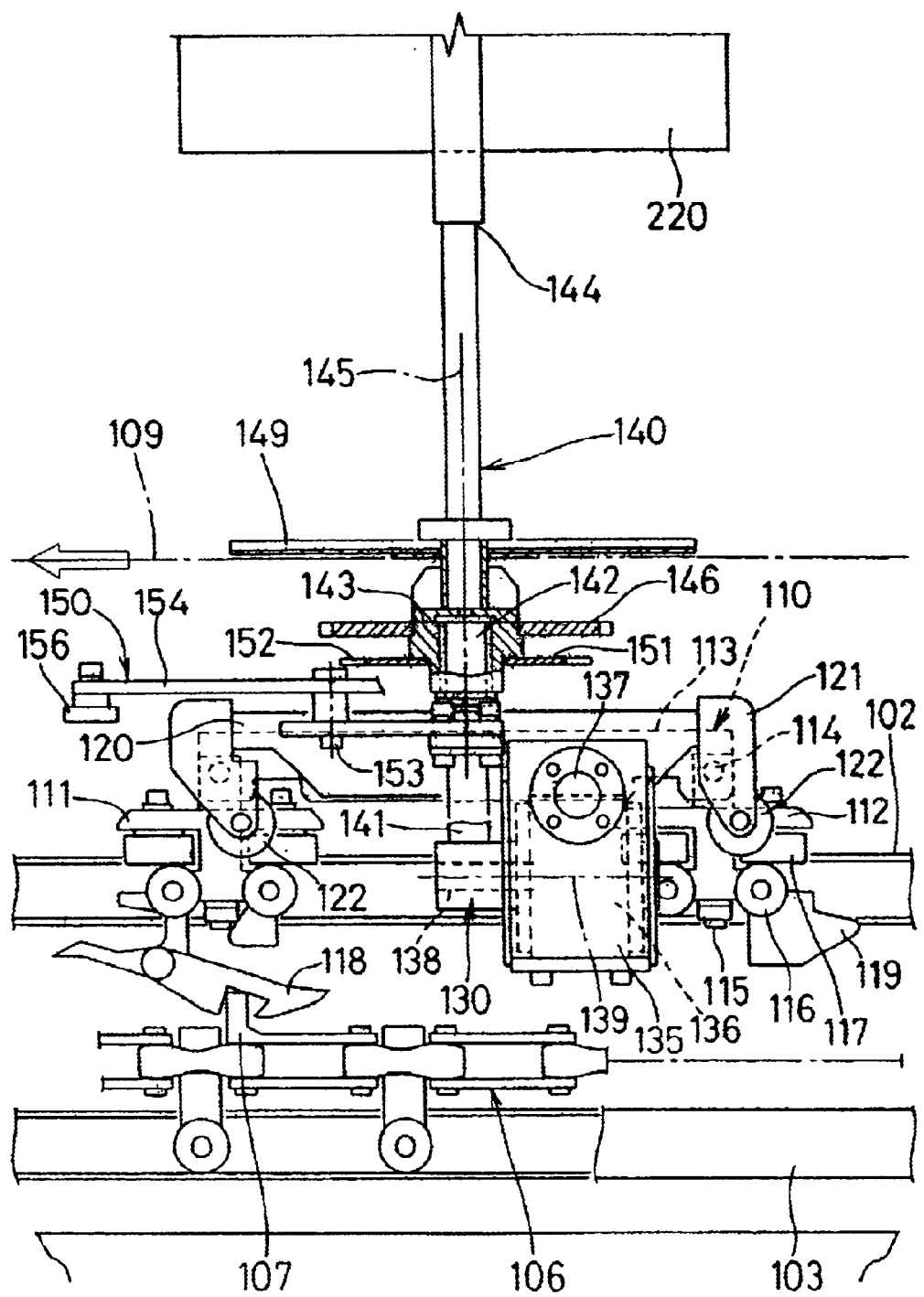
FIG. 9 is a cutaway side view of a regular route section of the conveyance apparatus for use with carriages.

Commonly, the transport object support means 140 is rotated into an upwardly oriented vertical configuration, and while the transport object 220 supported by the transport object support means 140 is disposed above the carriage 110, the driver 106 exerts a driving force and causes the carriage 110 to move along the fixed route 109 as a result of the fact that the trolley wheels 116 of the trolley devices 111 and 112 are supported and guided by the carriage rail device 102 and that the transmission component 107 of the driver 106 is caused to engage the slave component 118, as shown in FIGS. 9 and 10.

In the process, the carriage 110 moves without swaying in the rolling direction or the like as a result of the fact that the guide wheel 117 is guided along the inwardly-oriented surface of the carriage rail device 102. In addition, the guide roller 122 disposed on the side of the rotary control means 130 is supported and guided by the guide rail 123 laid between the carriage rail device 102 and the anteroposterior axis 139 while weight balance is preserved in the transverse direction, allowing the transport object support means 140 to rotate or the carriage 110 to move smoothly without causing the transport object support means 140 to sway in the vertical direction. The transport object 220 can thus be treated accurately and efficiently in a variety of ways.

The carriage 110 is moved smoothly and efficiently as a result of the fact that the links between the carriage body 113 and the trolley devices 111 and 112 are rotated relative to the transverse axis 114 and longitudinal axis 115 during the movement of the carriage along the fixed route 109, and particularly during the movement of the carriage along a transverse or vertical curved route portion.

Figure 11:
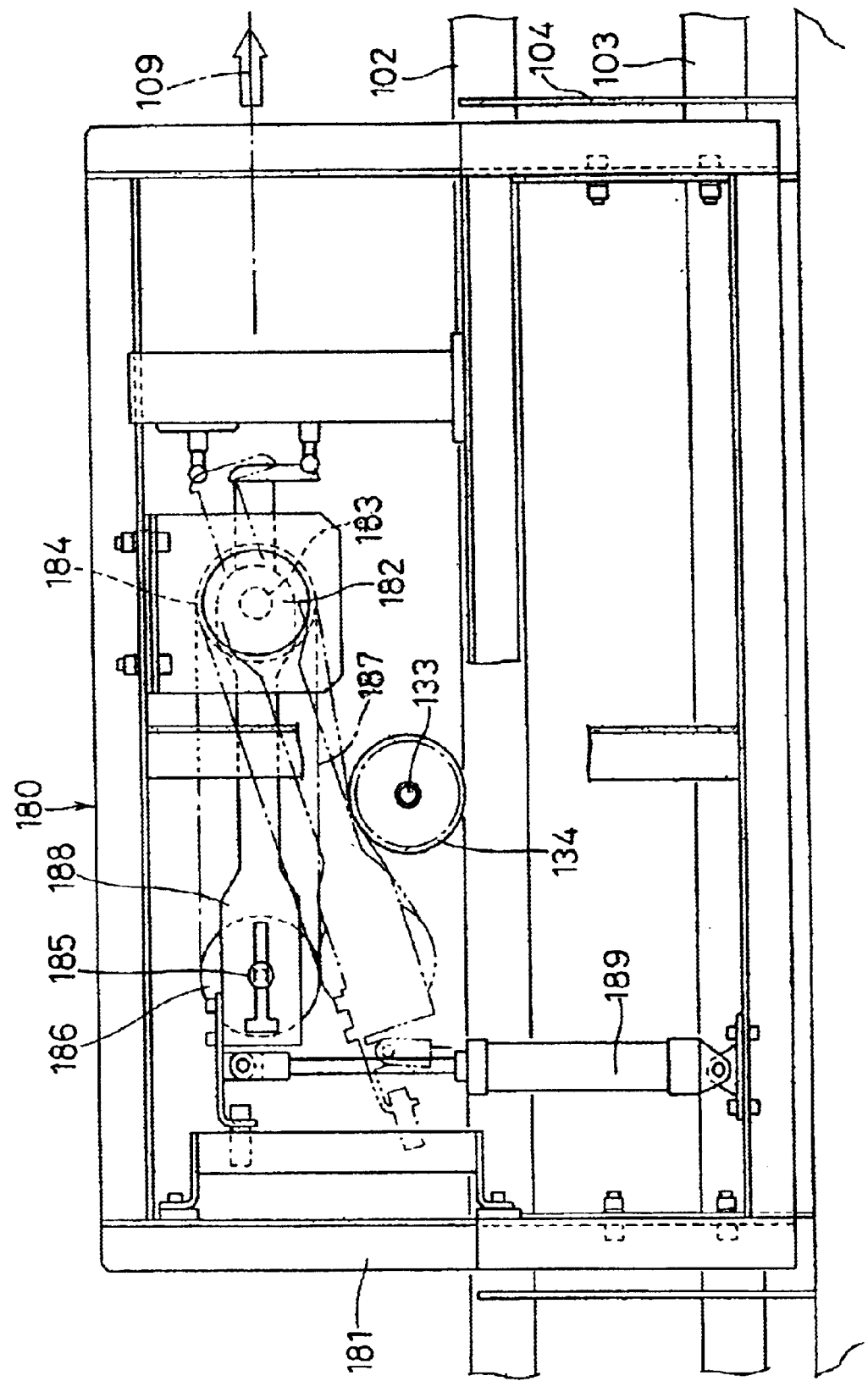
FIG. 11 is a side view of a rotary drive means in the conveyance apparatus for use with carriages.
Figure 12:
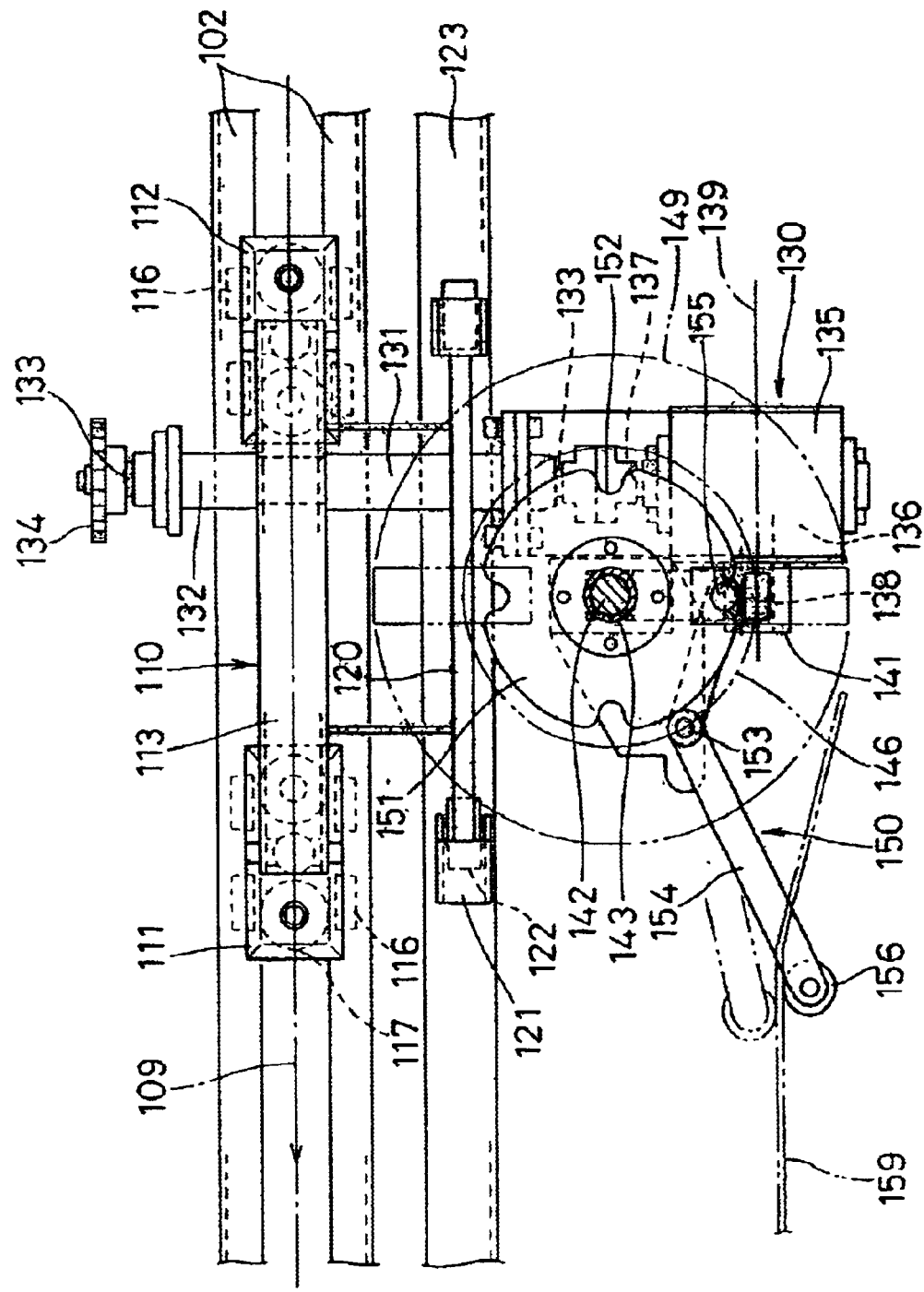
FIG. 12 is a cutaway plan view of the regular route section of the conveyance apparatus for use with carriages.

The carriage 110 thus moving is stopped at a prescribed location inside the first-stage electrodeposition chamber 160, as shown in FIGS. 6, 10, and 11. The carriage is stopped by the stopper means 210. Specifically, the control element 213 is pushed in by the extension of the cylinder device 212, and the control element 213 is urged by the slave component 118, disengaged from the transmission component 107, and locked in place (stopper action). As a result, the driven sprocket 134 in the rotary control means 130 moves underneath the chain 187 in the rotary drive means 180 and stops there (see the solid line in FIG. 11).

In this state, the rotary control means 130 is rotated by the rotary drive means 180. Specifically, the plate 188 in the rotary drive means 180 is caused to descend and rotate about the axis of the output shaft 183 by the contraction of the cylinder device 189, whereby the chain 187 engages the driven sprocket 134 from above (see the imaginary line in FIG. 11).

The chain 187 is driven by the rotary driver 182 in the longitudinal direction, and the rotational force of the chain 187 is transmitted to the output shaft 138 via the driven sprocket 134, control shaft 133, input shaft 137, and worm gear mechanism 136, causing the transport object support means 140 to rotate downward about the anteroposterior axis 139 and to assume a pendant position.

After the component has rotated downward through a prescribed angle, the plate 188 is lifted and rotated about the axis of the output shaft 183 by the extension of the cylinder device 189, causing the chain 187 to move upward and to disengage from the driven sprocket 134 (see the solid line in FIG. 11), whereby the rotary control means 130 is stopped and the transport object support means 140 is locked in a downward pendant position.

As a result, the transport object 220 supported by the support 144 at the free end of the transport object support means 140 is introduced (dipped) into the paint solution 162a in the paint solution tank 162, and is thus coated by electrodeposition (liquid treatment) in an appropriate manner, as shown by imaginary line (c) in FIG. 6.

After the desired electrodeposition coating has thus been performed, the chain 187 engages the driven sprocket 134 from above in the same manner in a state in which the rotary driver 182 is driven in reverse. As a result, the rotary control means 130 is urged in reverse relative to the above-described situation, and the transport object support means 140 is thus caused to rotate in the upward direction about the anteroposterior axis 139.

The upward rotation is stopped at a position in which the transport object support means 140 is tilted slightly upward relative to the horizontal (for example, by 100 degrees). In other words, the chain 187 is caused to move upward and disengage from the driven sprocket 134 by sensing the desired angle with a sensing means, whereby the transport object 220 supported by the transport object support means 140 is tilted in the manner shown by an imaginary line (d) in FIG. 6. This allows the transport object 220 to shed the paint solution 162a in an adequate manner.

After sufficient drainage, the carriage 110 is conveyed from the first-stage electrodeposition chamber 160 to the second-stage electrodeposition chamber 165. Specifically, the control element 213 is retracted by the contraction of the cylinder device 212 in the stopper means 210, releasing the urging and locking action (stopper action) applied to the slave component 118. As a result, the slave component 118 is caused to engage the transmission component 107, and the carriage 110 moves along the fixed route 109 under the urging of the driver 106.

This movement involves tilting the transport object 220, removing it from the first-stage electrodeposition chamber 160, and introducing it into the second-stage electrodeposition chamber 165. The second-stage electrodeposition chamber 165 is similar to the first-stage electrodeposition chamber 160 in that the transport object 220 supported by the support 144 at the free end of the transport object support means 140 is introduced into the paint solution 162a in the paint solution tank 162, and is thus coated by electrodeposition (liquid treatment) in an appropriate manner.

Because the transport object 220 is tilted in this case, less time is needed to rotate the transport object support means 140 downward into the pendant position. As a result, it is possible to reduce the residence time of the object in the second-stage electrodeposition chamber 165, and thus to render the entire apparatus more efficient or to form a better electrodeposition coating by increasing the coating time of the second stage.

In the second-stage electrodeposition chamber 165, excess liquid is shed in the same manner as in the first-stage electrodeposition chamber 160. After sufficient drainage, the rotary drive means 180 is urged in the opposite direction, whereby the transport object support means 140 is again upwardly rotated about the anteroposterior axis 139. As a result of this rotary operation, the transport object support means 140 is rotated into a vertical position, causing the transport object 220 supported by the transport object support means 140 to position itself above the carriage 110, as shown by a solid line in FIG. 6.

The carriage 110 is subsequently allowed to move again and to leave the second-stage electrodeposition chamber 165 by the release of the stopper means 210. The carriage 110 reaches the area occupied by the drying furnace 170 and passes underneath the drying chamber 172, whereby the transport object 220 is introduced into the drying chamber 172 by the transport object support means 140, as shown in FIG. 7. The transport object 220 travels in this state through the drying chamber 172, and the desired drying treatment is performed by the drying means 174 in the process.

In this case, the restriction imposed by the stopping device 150 is removed as a result of the fact that the cam roller 156 of the stopping device 150 is guided by the cam rail 159, and the turning roller 147 is guided by the turning guide rail 175 and subjected to the action of a turning force in this state. As a result, the cylindrical component 143 is turned in a stable manner about the longitudinal axis 145 in relation to the vertical shaft 142, allowing the transport object 220 supported on the cylindrical component 143 via the support 144 to be uniformly dried while being turned about the longitudinal axis 145. After the drying is completed, the transport object 220 is returned to its initial orientation, and the stopping device 150 is locked in place.

The transport object 220 thus dried in the drying furnace 170 is removed from the drying chamber 172 and introduced into the drying chamber of the final drying furnace 178, where the desired final drying treatment is performed by a drying means in the same manner as above. The carriage 110 is removed from the final drying furnace 178 and is then stopped facing the spray painting means 208, as shown in FIGS. 8 and 13–15.

Figure 8:
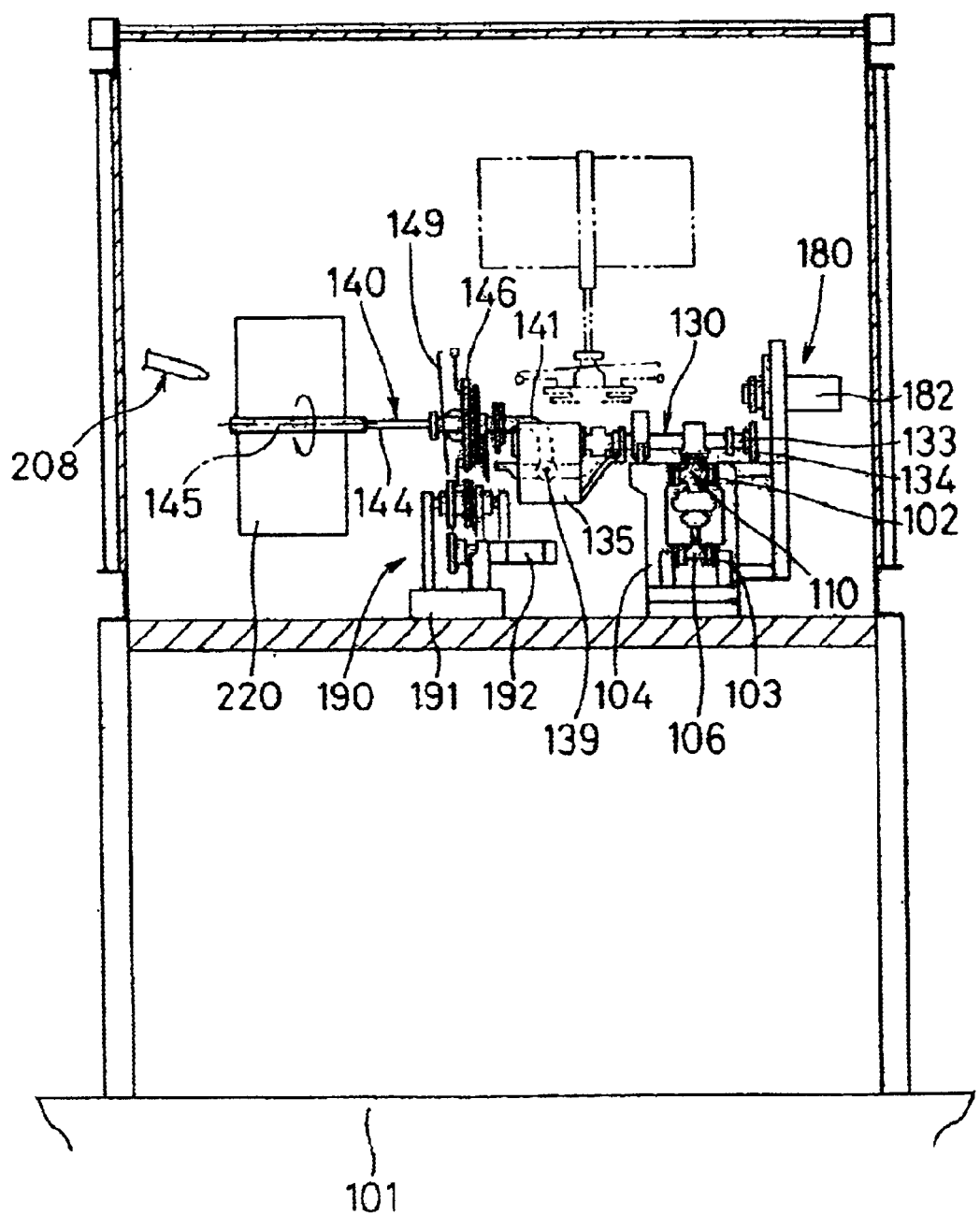
FIG. 8 is a longitudinal sectional rear view of a spray painting section of the conveyance apparatus for use with carriages.
Figure 14:
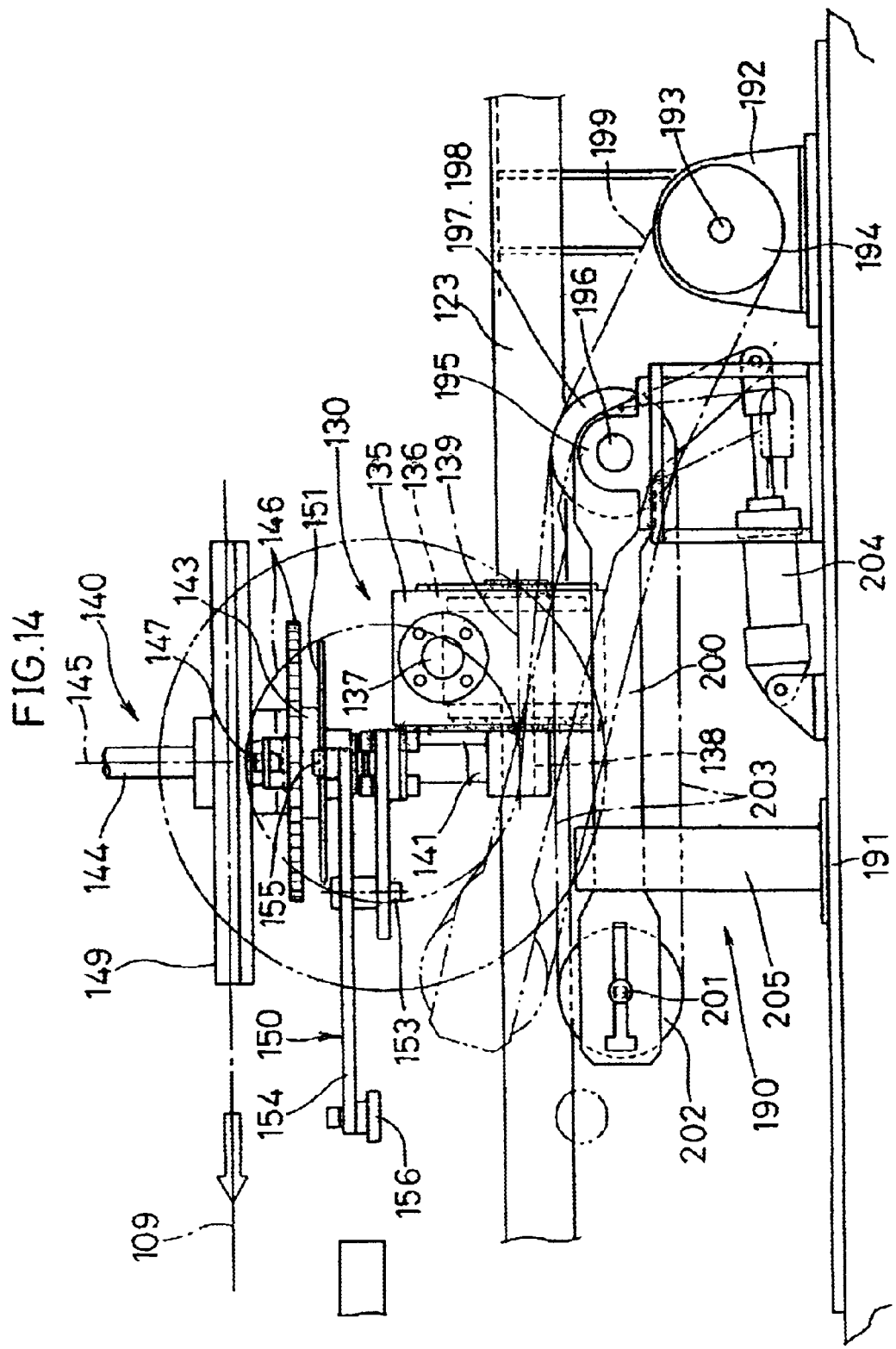
FIG. 14 is a side view of the turning means in the conveyance apparatus for use with carriages.

After the carriage has been stopped, the transport object support means 140 is caused to rotate downward by the rotary drive means 180 in the same manner as above, and is locked in a horizontal position, as shown by a solid line in FIG. 8 and an imaginary line in FIG. 14. The transport object 220 is subsequently turned about the longitudinal axis 145 by the turning means 190 with the aid of the support 144 or the like. Specifically, the arm plate 200 is lifted and rotated about the axis of the drive shaft 196 by the contraction of the cylinder device 204 in the turning means 190, whereby the chain 203 engages the turning wheel 146 from below, as shown by an imaginary line in FIG. 14.

The chain 203 is driven by the rotary driver 192 in the longitudinal direction, and the rotational force of the chain 203 is transmitted to the support 144 via the turning wheel 146 and cylindrical component 143, causing the transport object 220 to turn about the longitudinal axis 145. Consequently, the paint sprayed by the spray painting means 208 covers the transport object 220 in a uniform layer.

After the desired application of paint has been completed in this manner, the transport object support means 140 is rotated into the upwardly oriented vertical position in the same manner as above (as shown by an imaginary line in FIG. 8 and a solid line in FIG. 14), and the sprayed paint is optionally dried. The treated transport object 220 is then removed from the transport object support means 140 in the regular route section of the fixed route 109, and a new transport object 220 is loaded.

Although the two embodiments were described with reference to a case in which the carriage 10 (110) was a two-trolley system in which the front trolley device 11 (111) and rear trolley device 12 (112) were linked together by a carriage body 13 (113), it is also possible to fashion the carriage 10 (110) as a system having three, four, or more trolleys in accordance with the shape or length of the transport object 85 (220).

Although the two embodiments were described with reference to a case in which the rotary control means 30 (130) was supported and guided by a guide rail 27 (123), it is also possible to dispense with the support and guidance structure based on the guide rail 27 (123).

Although the two embodiments were described with reference to a case in which the rotary control means 30 (130) was provided with a detachable rotary drive means 70 (180), it is also possible to adopt an arrangement in which the rotary drive means 70 (180) is disposed facing the carriage 10 (110) and is integrated with the rotary control means 30 (130).

Although the two embodiments were described with reference to a transport object support means 40 (140) in which the support 44 (144) could turn, it is also possible to use a transport object support means 40 (140) that is incapable of turning.

Although the two embodiments were described with reference to a case in which the treatment section comprised an electrodeposition chamber 50, first-stage electrodeposition chamber 160, second-stage electrodeposition chamber 165, drying furnace 60 (170), and final drying furnace 68 (178), it is also possible to modify this arrangement in order to obtain treatment sections in which the transport objects 85 (220) can be spray-painted and subjected to a variety of other treatments.

Although the second embodiment was described with reference to a case in which the rotary drive means 180 was configured such that a chain 187 could be put in or out of engagement with the driven sprocket 134 from above, it is also possible to adopt an arrangement in which the chain 187 can be put in or out of engagement with the driven sprocket 134 from below, in a longitudinal direction, or the like.

Although the second embodiment was described with reference to a case in which the turning means 190 was configured such that the chain 203 could be put in or out of engagement with the turning wheel 146 from below, it is also possible to adopt an arrangement in which the chain 203 can be put in or out of engagement with the turning wheel 146 from another direction.

What is claimed is:

1. A conveyance apparatus for use with carriages, comprising a rail device and a carriage configured to be supported and guided by this rail device and allowed to move along a fixed route, wherein the carriage is provided with a rotary control means configured to extend to the left and right from the carriage, a transport object support means capable of rotating about an anteroposterior axis is provided to a free end section of the rotary control means, and the rotary control means is configured to be supported and guided by a guide rail laid along the rail device and between the rail device and the anteroposteriolr axis.

2. A conveyance apparatus for use with carriages as claimed in claim 1, wherein the rotary drive means capable of connecting with and disconnecting from the rotary control means is provided at a prescribed location along the fixed route.

3. A conveyance apparatus for use with carriages as claimed in claim 2, wherein the rotary control means has a transversely extending control shaft, and the rotary drive means can be put in or out of engagement with the control shaft by being moved transversely.

4. A conveyance apparatus for use with carriages as claimed in claim 2, wherein the rotary control means has a transversely extending control shaft, and the rotary drive means can be put in or out of engagement with the control shaft by being moved to approach to or a distance from an external periphery.

5. A conveyance apparatus for use with carriages as claimed in any of claims 1 to 4, wherein the transport object support means comprises a base on a side of the rotary control means and a distal portion for supporting a transport object, the distal portion being able to pivot about a longitudinal axis in relation to the base.

6. A conveyance apparatus for use with carriages as claimed in claim 5, wherein the fixed route is configured to pass through a treatment section, and the rotary control means is configured to be rotated in accordance with the type of treatment performed in this treatment section.

7. A conveyance apparatus for use with carriages as claimed in claim 6, wherein at a prescribed location along the fixed route, a turning means is provided for turning, about a longitudinal axis, the transport object support means that has been rotated about an anteroposterior axis in a horizontal position.

8. A conveyance apparatus for use with carriages as claimed in claim 5, wherein the transport object support means is configured to be rotated into a pendant position, and a liquid treatment is configured to be performed on the transport object supported on a free end section of the transport object support means in a treatment section.

9. A conveyance apparatus for use with carriages as claimed in claim 8, wherein at a prescribed location along the fixed route, a turning means is provided for turning, about a longitudinal axis, the transport object support means that has been rotated about an anteroposterior axis in a horizontal position.

10. A conveyance apparatus for use with carriages as claimed in claim 5, wherein at a prescribed location along the fixed route, a turning means is provided for turning, about a longitudinal axis, the transport object support means that has been rotated about an anteroposterior axis in a horizontal position.

11. A conveyance apparatus for use with carriages as claimed in any of claims 1 to 4, wherein the fixed route is configured to pass through a treatment section, and the rotary control means is configured to be rotated in accordance with the type of treatment performed in this treatment section.

12. A conveyance apparatus for use with carriages as claimed in any of claims 1 to 4, wherein the transport object support means is configured to be rotated into a pendant position, and a liquid treatment is configured to be performed on a transport object supported on a free end section of the transport object support means in a treatment section.

13. A conveyance apparatus for use with carriages as claimed in any of claims 1 to 4, wherein the fixed route is configured to pass through an electrodeposition chamber and a drying furnace; in the electrodeposition chamber, the transport object support means is configured to be rotated into a pendant position where the transport object supported on the free end section of the transport object support means is introduced into a paint solution tank, and the transport object support means is configured to then be rotated into a horizontal position where the transport object is drained of excess solution; and in the drying furnace, the transport object support means is configured to be rotated into a vertical position where the transport object is dried.

14. A conveyance apparatus for use with carriages as claimed in any of claims 1 to 4, wherein characterized in that the fixed route is configured to pass through a plurality of treatment sections; the first-stage treatment section is an electrodeposition chamber; the transport object support means is configured to be rotated into a pendant position where the transport object supported on the free end section of the transport object support means is introduced into a paint solution tank, and the transport object support means is configured to be rotated and tilted slightly upward relative to the horizontal position where the transport object is drained of excess solution; and the object is configured to be conveyed in the tilted state to a second-stage treatment section.

* * * * *

UNITED STATES PATENT AND TRADEMARK OFFICE
CERTIFICATE OF CORRECTION

PATENT NO.    : 6,919,008 B2
DATED         : July 19, 2005
INVENTOR(S)   : Katsuyoshi Makimura et al.

It is certified that error appears in the above-identified patent and that said Letters Patent is hereby corrected as shown below:

<u>Title page,</u>
Insert Item -- [30]    Foreign Application Priority Data

Mar. 31, 2000       (JP)       2000-096002
        Oct. 20, 2000       (JP)       2000-320124 --.

Signed and Sealed this

Eleventh Day of October, 2005

JON W. DUDAS
*Director of the United States Patent and Trademark Office*